US012736804B2

(12) United States Patent
Dong et al.

(10) Patent No.: US 12,736,804 B2
(45) Date of Patent: Sep. 15, 2026

(54) METHOD FOR OPTIMIZING OR ONLINE OPTIMIZING EXTRINSIC PARAMETERS OF FISHEYE-LENS CAMERAS APPLIED TO SURROUND-VIEW STITCHING

(71) Applicant: VIA TECHNOLOGIES, INC., New Taipei City (TW)

(72) Inventors: Fan Dong, Beijing (CN); Cho-Han Wu, New Taipei City (TW)

(73) Assignee: VIA TECHNOLOGIES, INC., New Taipei City (TW)

( * ) Notice: Subject to any disclaimer, the term of this patent is extended or adjusted under 35 U.S.C. 154(b) by 0 days.

(21) Appl. No.: 18/826,466

(22) Filed: Sep. 6, 2024

(65) Prior Publication Data

US 2025/0086835 A1 Mar. 13, 2025

(30) Foreign Application Priority Data

Sep. 7, 2023 (CN) ......................... 202311152370.2
Sep. 3, 2024 (CN) ......................... 202411230045.8

(51) Int. Cl.
*G06T 7/80* (2017.01)
*G01M 11/02* (2006.01)
*G02B 27/00* (2006.01)

(52) U.S. Cl.
CPC ..... *G02B 27/0012* (2013.01); *G01M 11/0257* (2013.01); *G06T 7/80* (2017.01);
(Continued)

(58) Field of Classification Search
CPC ......... G02B 27/0012; G06T 7/80; G06T 7/85; G06T 2207/20221; G06T 2207/30256;
(Continued)

(56) References Cited

U.S. PATENT DOCUMENTS 9,553,618 B2 * 1/2017 Tian ........................ H04L 25/03
9,723,272 B2 * 8/2017 Lu ............................ G06T 7/33
(Continued)

FOREIGN PATENT DOCUMENTS

CN 102356633 A 2/2012
CN 108765496 A 11/2018
(Continued)

OTHER PUBLICATIONS

Chinese language office action dated Mar. 12, 2025, issued in application No. TW 113133892.
(Continued)

*Primary Examiner* — Brian P Yenke
(74) *Attorney, Agent, or Firm* — McClure, Qualey & Rodack, LLP

(57) ABSTRACT

A method and system is provided in a simulation platform for optimizing the extrinsic parameters of fisheye-lens cameras installed on a vehicle. A simulated vehicle is established according to vehicular characteristics of associated actual vehicle over the simulated platform, thereby a lot of simulated checkerboard calibration plates are placed surrounding the simulated vehicle. A lot of simulated fisheye-lens cameras are generated and mounted on the simulated vehicle based on intrinsic parameters associated with actual fisheye lenses, and fisheye images are derived by using the simulated fisheye-lens cameras, respectively. The initially extrinsic parameters of each of the simulated fisheye-lens cameras are calculated over the simulated platform by using the first characteristic points of its own first fisheye image. Those initially extrinsic parameters may be used to optimize stitching images of the vehicle-surrounding-view systems, or be used to calculate installation tolerances when disposing fisheye-lens cameras physically.

26 Claims, 15 Drawing Sheets

(52) U.S. Cl.
CPC ............... *G06T 2207/20221* (2013.01); *G06T 2207/30256* (2013.01)

(58) Field of Classification Search
CPC ......... G01M 11/0257; B60R 2300/303; B60R 2300/304
See application file for complete search history.

(56) References Cited

U.S. PATENT DOCUMENTS

| | | | | |
|---|---|---|---|---|
| 9,986,173 | B2 * | 5/2018 | Wang | H04N 17/002 |
| 10,504,242 | B2 * | 12/2019 | Mou | G06T 7/80 |
| 10,582,186 | B1 * | 3/2020 | Baldwin | H04N 13/243 |
| 10,625,676 | B1 * | 4/2020 | Tsimhoni | G05D 1/0088 |
| 10,911,745 | B2 * | 2/2021 | Shivalingappa | B60R 1/27 |
| 11,055,541 | B2 * | 7/2021 | Wallin | G06V 10/147 |
| 11,257,272 | B2 * | 2/2022 | Rowell | G06T 1/0014 |
| 11,609,574 | B2 * | 3/2023 | Walters | G05D 1/0206 |
| 11,693,417 | B2 * | 7/2023 | George | G05D 1/0221 701/23 |
| 11,812,153 | B2 * | 11/2023 | Liu | H04N 23/698 |
| 11,948,315 | B2 * | 4/2024 | Ren | H04N 23/698 |
| 12,026,229 | B2 * | 7/2024 | Vahedforough | G06N 20/00 |
| 12,217,458 | B1 * | 2/2025 | Yang | G06T 7/80 |
| 12,405,116 | B2 * | 9/2025 | Mu | G06T 7/80 |
| 12,511,783 | B1 * | 12/2025 | Chen | G06T 7/80 |
| 12,530,799 | B2 * | 1/2026 | Wang | G06T 7/80 |
| 2012/0287232 | A1 * | 11/2012 | Natroshvili | G06T 7/33 348/36 |
| 2014/0098229 | A1 * | 4/2014 | Lu | G06T 7/80 348/148 |
| 2015/0254825 | A1 | 9/2015 | Zhang | |
| 2015/0329048 | A1 * | 11/2015 | Wang | G06T 7/80 348/148 |
| 2016/0088287 | A1 | 3/2016 | Sadi | |
| 2018/0007263 | A1 | 1/2018 | Vandrotti | |
| 2018/0184078 | A1 * | 6/2018 | Shivalingappa | B60R 1/27 |
| 2018/0336297 | A1 * | 11/2018 | Sun | G01M 17/00 |
| 2019/0058870 | A1 | 2/2019 | Rowell | |
| 2019/0102911 | A1 * | 4/2019 | Natroshvili | G06T 7/85 |
| 2020/0150677 | A1 * | 5/2020 | Walters | G05D 1/0206 |
| 2020/0293054 | A1 * | 9/2020 | George | G06N 3/08 |
| 2020/0294194 | A1 * | 9/2020 | Sun | G06T 7/30 |
| 2020/0302696 | A1 | 9/2020 | Thompson | |
| 2020/0342652 | A1 * | 10/2020 | Rowell | G06V 10/82 |
| 2020/0388150 | A1 | 12/2020 | Herson | |
| 2021/0082086 | A1 | 3/2021 | Bichu | |
| 2021/0092354 | A1 * | 3/2021 | Shivalingappa | H04N 17/002 |
| 2022/0137636 | A1 * | 5/2022 | Yang | G01S 17/894 701/28 |
| 2022/0321859 | A1 * | 10/2022 | Kim | H04N 13/293 |
| 2023/0024474 | A1 | 1/2023 | Ren | |
| 2023/0032613 | A1 | 2/2023 | Duan | |
| 2023/0283906 | A1 * | 9/2023 | Liu | H04N 23/698 348/148 |
| 2023/0319218 | A1 | 10/2023 | Ren | |
| 2024/0424988 | A1 * | 12/2024 | Burns | B60R 1/27 |
| 2024/0430574 | A1 * | 12/2024 | Burns | H04N 23/90 |
| 2025/0085192 | A1 * | 3/2025 | Dong | G02B 27/0012 |
| 2025/0085530 | A1 * | 3/2025 | Dong | G06T 3/4038 |
| 2025/0244571 | A1 * | 7/2025 | Dong | G02B 27/0012 |
| 2026/0004459 | A1 * | 1/2026 | Wang | G06T 7/80 |
| 2026/0017877 | A1 * | 1/2026 | Sabo | G06T 15/205 |

FOREIGN PATENT DOCUMENTS

| | | | |
|---|---|---|---|
| CN | 109407547 | A | 3/2019 |
| CN | 109615659 | A | 4/2019 |
| CN | 110677599 | A | 1/2020 |
| CN | 105765966 | B | 7/2020 |
| CN | 111698463 | A | 9/2020 |
| CN | 113093740 | A | 7/2021 |
| CN | 113191032 | A | 7/2021 |
| CN | 113496527 | A | 10/2021 |
| CN | 113905176 | A | 1/2022 |
| CN | 215972078 | U | 3/2022 |
| CN | 114339157 | A | 4/2022 |
| CN | 116051379 | A | 5/2023 |
| CN | 116485984 | A | 7/2023 |
| JP | 2020008664 | A | 1/2020 |
| KR | 102508361 | B1 | 3/2023 |
| TW | I607911 | B | 12/2017 |
| TW | 201913561 | A | 4/2019 |
| TW | 202321678 | A | 6/2023 |

OTHER PUBLICATIONS

Chinese language office action dated May 12, 2025, issued in application No. TW 113133890.

Chinese language office action dated Sep. 12, 2024, issued in application No. TW 112140701.

Chinese language office action dated Feb. 23, 2024, issued in application No. TW 112140699.

Chinese language office action dated Jan. 15, 2025, issued in application No. TW 113133894.

Chinese language office action dated Jan. 15, 2025, issued in application No. TW 113133895.

Office Action dated Mar. 16, 2026, issued in application U.S. Appl. No. 18/826,485.

Notice of Allowance dated May 27, 2026, issued in application U.S. Appl. No. 18/826,500.

* cited by examiner

METHOD FOR OPTIMIZING OR ONLINE OPTIMIZING EXTRINSIC PARAMETERS OF FISHEYE-LENS CAMERAS APPLIED TO SURROUND-VIEW STITCHING

CROSS REFERENCE TO RELATED APPLICATIONS

This application claims priority of China Patent Application No. 202311152370.2, filed on Sep. 7, 2023, and China Application No. 202411230045.8, filed on Sep. 3, 2024, the entirety of which is incorporated by reference herein.

FIELD OF THE INVENTION

The present invention relates to a method and system for optimizing extrinsic parameters of fisheye-lens cameras, and particular, to an online optimization method and system for optimizing extrinsic parameters of fisheye-lens cameras installed on a vehicle.

DESCRIPTION OF THE RELATED ART

At present, vehicle-surround-view systems usually use offline calibrations to optimize extrinsic parameters of fisheye-lens cameras installed thereon. Optimizations to those extrinsic parameters of the fisheye-lens cameras is a technical focus because optimized position and rotation angle for each fisheye-lens camera directly determines the surround-view effects of the vehicle-surround-view systems. However, the construction processes of offline optimizing such extrinsic parameters for the vehicle-surround-view systems are relatively cumbersome, which consumes manpower and financial resources, and requires skilled persons having a certain level of technical proficiency under operations. In addition, the construction processes may fit strict requirements on light, environment, climate, . . . , etc., such that there may be no suitable place or vehicle model for extrinsic-parameter optimizations.

BRIEF SUMMARY OF THE INVENTION

An embodiment of the present invention provides a method and system for optimizing the extrinsic parameters of the fisheye-lens cameras, which is suitable for a simulation platform used for online optimizing extrinsic parameters of the fisheye-lens cameras mounted on a vehicle. A simulated vehicle is established over the simulation platform according to vehicular characteristics of associated actual vehicle and a plurality of simulated checkboard calibration plates are placed surrounding the simulated vehicle. A plurality of simulated fisheye-lens cameras are established and mounted on the simulated vehicle in the simulation platform according to the intrinsic parameters of the actual fisheye-lens cameras. The initial extrinsic parameters of each of the simulated fisheye-lens cameras are calculated over the simulated platform by using the first characteristic points shown in its own first fisheye image. The initial extrinsic parameters may be references when installing the fisheye-lens cameras on the vehicle physically.

According to the method described above, the extrinsic parameters of the fisheye-lens cameras are optimized by using at least one second fisheye images obtained therefrom.

According to the method described above, reference extrinsic parameters are introduced into one of two adjacent simulated fisheye-lens cameras to generate a third stitching images so as to derive installation tolerances when disposing fisheye-lens cameras physically.

According to the method described above, the reference extrinsic parameters are obtained by introducing an offset into the initial extrinsic parameters.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
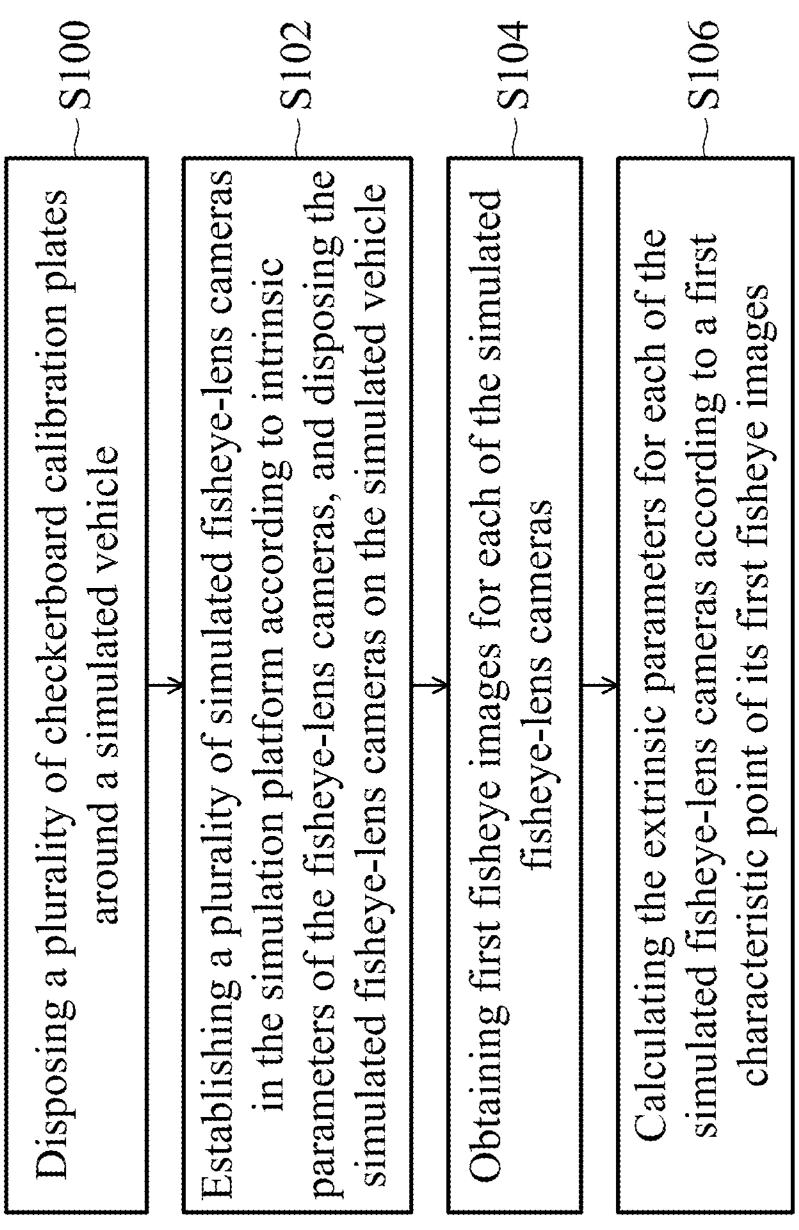
FIG. 1 is a flow diagram of obtaining the initial extrinsic parameters of a fisheye-lens camera mounted on a vehicle in accordance with the present invention.

In order to make the above purposes, features, and advantages of some embodiments of the present invention more comprehensible, the following is a detailed description in conjunction with the accompanying drawing.

Certain terms are used throughout the description and following claims to refer to particular components. As one skilled in the art will understand, electronic equipment manufacturers may refer to a component by different names. This document does not intend to distinguish between components that differ in name but not function. It is understood that the words “comprise”, “have” and “include” are used in an open-ended fashion, and thus should be interpreted to mean “include, but not limited to . . . ”. Thus, when the terms “comprise”, “have” and/or “include” used in the present invention are used to indicate the existence of specific technical features, values, method steps, operations, units and/or components. However, it does not exclude the possibility that more technical features, numerical values, method steps, work processes, units, components, or any combination of the above can be added.

The directional terms used throughout the description and following claims, such as: “on”, “up” “above”, “down”, “below”, “front”, “rear”, “back”, “left”, “right”, etc., are only directions referring to the drawings. Therefore, the directional terms are used for explaining and not used for limiting the present invention. Regarding the drawings, the drawings show the general characteristics of methods, structures, and/or materials used in specific embodiments. However, the drawings should not be construed as defining or limiting the scope or properties encompassed by these embodiments. For example, for clarity, the relative size, thickness, and position of each layer, each area, and/or each structure may be reduced or enlarged.

When the corresponding component such as layer or area is referred to as being “on another component”, it may be directly on this other component, or other components may exist between them. On the other hand, when the component is referred to as being “directly on another component (or the variant thereof)”, there is no component between them. Furthermore, when the corresponding component is referred to as being “on another component”, the corresponding component and the other component have a disposition relationship along a top-view/vertical direction, the corresponding component may be below or above the other component, and the disposition relationship along the top-view/vertical direction is determined by the orientation of the device.

The terms “about”, “equal to”, “equal” or “the same”, “substantially” or “eventually” are generally interpreted to mean within 20% of a given value or range, or to mean within a given value or range within 10%, 5%, 3%, 2%, 1% or 0.5% of a given value or range.

It should be understood that when a component or layer is referred to as being “connected to” another component or layer, it can be directly connected to this other component or layer, or intervening components or layers may be present. In contrast, when a component is referred to as being “directly connected to” another component or layer, there are no intervening components or layers present.

The electrical connection or coupling described in this disclosure may refer to direct connection or indirect connection. In the case of direct connection, the endpoints of the components on the two circuits are directly connected or connected to each other by a conductor line segment, while in the case of indirect connection, there are switches, diodes, capacitors, inductors, resistors, other suitable components, or a combination of the above components between the endpoints of the components on the two circuits, but the intermediate component is not limited thereto.

The words “first”, “second”, “third”, “fourth”, “fifth”, and “sixth” are used to describe components. They are not used to indicate the priority order of or advance relationship, but only to distinguish components with the same name.

It should be noted that the technical features in different embodiments described in the following can be replaced, recombined, or mixed with one another to constitute another embodiment without departing from the spirit of the present invention.

In order to better describe the embodiments of the present invention, some specific terms used in the present invention are firstly defined as below.

Glossary

Fisheye lens: a fisheye lens is an ultra-wide-angle lens that produces strong visual distortion intended to create a wide panoramic or hemispherical image. A modern vehicle may install some cameras equipped with fisheye lenses (“fisheye-lens cameras” for short) and then stitch images obtained therefrom to show the real scene surrounding itself for driver’s references. The positions and rotation angles of the those fisheye-lens cameras mounted on a vehicle are critical parameters of establishing surround-views such that it is very important to perform optimization processes thereon so as to obtain optimized positions and rotation angles before driving on the road. Those optimization processes are actually performed on a fisheye-lens camera installed on the vehicle, but “fisheye lens” may be used to indicate the aforementioned fisheye-lens cameras in the disclosure, especially when the intrinsic parameters of fisheye lenses of the fisheye-lens cameras are mentioned.

Extrinsic parameters of a fisheye lens: extrinsic parameters of a fisheye-lens camera describe its position and rotation angle which are derived from its displacement and tilts/roll over the vehicle it is disposed. A user may perform optimization processes to adjust the extrinsic parameters of the fisheye-lens cameras mounted on a simulated vehicle until optimized extrinsic parameters needed for the surrounding-view effect are found.

Intrinsic parameters of a fisheye lens: the intrinsic parameters of a fisheye lens describe the mapping of the scene in front of the fisheye lens to the pixels in the final image, which include focal length, optical center, and lens distortion (such as radial lens distortion and tangential lens distortion) of a fisheye lens, . . . etc.

Adjacent fisheye-lens cameras: adjacent fisheye-lens cameras mounted on a vehicle may show at least one identical objects (or features) in their fisheye images and the identical object(s) may be used to make a stitching image. For example, both the front and right-front fisheye-lens cameras of a six-camera vehicle (counterclockwise around the vehicle, they are front camera, left-front camera, left-rear camera, rear camera, right-rear camera, and right-front camera) may show at least one identical object in their fisheye images, but those fisheye images generated from the right-rear and the left-front fisheye-lens cameras may not show any identical object therein. “Adjacent simulated fisheye lenses” are used to indicate the relationship between two fisheye-lens cameras similar to that of the front and right-front fisheye-lens cameras in the disclosure.

Simulation platform: an online system used for simulating the surround-view effect of a vehicle. The simulated platform builds-in a lot of simulate vehicles, simulated fisheye-lens cameras, simulated checkerboard calibration plates, and simulated places, . . . , etc., as the provisions of online obtaining the initial extrinsic parameters of the fisheye-lens cameras as well as online optimizing the extrinsic parameters of the fisheye-lens cameras for the vehicle-surround-view systems.

Simulated vehicle: a vehicle in the simulated platform having vehicular characteristics such as its dimension (e.g., length, width, height, shape, . . . , etc.), weight, speed, and braking ability, . . . etc., the same as that of associated actual vehicle.

Simulated fisheye lens: a fisheye lens in the simulated platform having intrinsic parameters the same as that of associated real fisheye lens.

Simulated checkerboard calibration plate: a checkerboard calibration plate in the simulated platform having checkerboard characteristics (e.g., side, shape, grid, and pattern(s) thereon, . . . , etc., "checkerboard characteristics" for short) the same as that of actual checkerboard calibration plate.

Simulated place: a place or a location in the simulated platform used for simulating the surround-view effects of a simulated vehicle.

Reference extrinsic parameters: reference extrinsic parameters are made by introducing offsets into associated initial extrinsic parameters. Simulated fisheye-lens cameras may apply reference extrinsic-parameters to generate surround-view stitching images, and then increase the offsets introduced into the initial extrinsic parameters if the surround-view stitching images are correct (e.g., the error of the overlap regions of the stitching image is smaller/less than associated predetermined threshold(s) for optimizations). The offsets are increasing gradually until the surround-view stitching image generated by introducing a certain amount of offsets into the initial extrinsic parameters is verified incorrect (e.g., the error of the overlap regions of the stitching image is larger/higher than the predetermined threshold(s) for optimizations). The certain amount of offsets introducing into the initial extrinsic parameters that generate the last correct surround-view stitching image may be the installation tolerance as the references when the user installs fisheye-lens cameras on the vehicle physically.

In the conventional offline processes for optimizing extrinsic parameters of fisheye-lens cameras physically mounted on a vehicle, this vehicle may be driven to a dedicated place for calibrations and then place chessboard calibration plates surrounding the vehicle under suitable distances. At least one surround-view stitching images is derived based on the fisheye images generated from those fisheye-lens cameras and is then used to optimize their extrinsic parameters. Since the above extrinsic-parameter optimization processes need to be repeatedly performed to achieve the purpose of optimizing the extrinsic parameters of the fisheye-lens cameras, it is necessary to manually install them on the vehicle, obtain actual displacements and rotation angles of those fisheye-lens cameras, move the vehicle to obtain multi-view images, to determine whether their extrinsic parameters have been optimized completely. If the aforementioned extrinsic-parameter optimization processes need to be re-executed or re-adjusted, it is necessary to drive the vehicle to this dedicated place for calibration and repeat all the above processes again, which will prolong whole the optimization period for the extrinsic-parameters of the fisheye-lens cameras. Additionally, if this need-to-be-readjusted vehicle is a special purpose vehicle (such as a mining vehicle, a garbage truck, . . . etc.), it may be necessary to reschedule a time of dispatching this special purpose vehicle and to book the dedicated place again, which is obvious a time-wasting as well as cost-wasting approach (especially, the cost of dispatching a special purpose vehicle may be very expensive).

The inventors have recognized the inefficiencies about conventional offline optimizations for extrinsic parameters of fisheye-lens cameras, such that they move all offline extrinsic-parameter optimization processes to an online simulation platform, which creates a simulation environment including but not limited, establishing a simulated place for calibration, selecting a simulated vehicle (having consistently vehicular characteristics with associated actual vehicle), allocating simulation chessboard calibration plates surrounding the simulated vehicle, and setting up simulation fisheye-lens cameras (on the simulated vehicle) according to intrinsic parameters consistent to associated actual fisheye lenses. Initial extrinsic parameters of those simulated fisheye-lens cameras are derived over the simulated platform thereafter. Users may physically install fisheye-lens cameras on their vehicles by referring the derived initial extrinsic parameters, or further optimize the initial extrinsic parameters as the needs of vehicle-surround-view systems by optimizing the stitching images made by using the fisheye images obtained those fisheye-lens cameras. Additionally, since the simulated platform builds-in a lot of simulated fisheye-lens cameras having different focuses or different models, any user may select specific simulated fisheye-lens cameras suitable for their simulated vehicles over the simulated platform and may obtain initial extrinsic parameters/optimize the extrinsic parameters until he/she finds the most suitable fisheye-lens camera.

Moreover, the inventors have also recognized there are many vehicles having no fisheye-lens cameras installed thereon at the time of factory release and it is very inconvenient to install fisheye-lens cameras on such vehicles over the aftermarkets by means of offline approaches to obtain required initial extrinsic parameters. However, any user may obtain his/her initial extrinsic parameters as the references of physical installations by establishing his/her simulated vehicle, mounting his/her simulated fisheye-lens cameras on the simulated vehicle according to intrinsic parameters of the simulated fisheye-lens cameras over the simulated platform. And, he/she may optimize the extrinsic parameters of those fisheye-lens cameras mounted on the vehicle by means of the simulated platform. On the other hand, over the aftermarket, the vehicle owners may install those fisheye-lens cameras on their vehicles by themselves, which may raise lots of deviations caused from non-proficient skills. However, users may additionally refer to the installation tolerances provided by the simulated platform for physical installations, or to find protective housings with suitable thicknesses to protect their fisheye-lens cameras.

FIG. 1 is a flow diagram of a method of obtaining initially extrinsic-parameters of fisheye-lens cameras in accordance with embodiments of the present invention. The flow diagram disclosed in FIG. 1 is suitable for a simulation platform for simulating a vehicle having multiple fisheye-lens cameras installed thereon. In some embodiments, the simulation platform may be, for example, Carla, PerScan, CarSim, VIRES VTD, PTV Vissim, or TESS NG, but the present invention is not limited thereto. As shown in FIG. 1, the disclosed method includes the following steps. A plurality of simulated checkerboard calibration plates are disposed around a simulated vehicle (step S100). A plurality of simulated fisheye-lens cameras are established in the simulation platform according to the intrinsic-parameters of associated actual fisheye lenses, and the simulated fisheye-lens cameras are disposed on the simulated vehicle (step S102). At least one first fisheye images are obtained through the simulated fisheye lenses (step S104), to calculate the initial extrinsic parameters of the simulated fisheye-lens cameras on the simulated vehicle (step S106). Accordingly, any user place simulated checkerboard calibration plates surrounding the simulated vehicle in step S100, and dispose simulated fisheye-lens cameras on the simulated vehicle in step S102, and finally required initial extrinsic parameters are automatically calculated by means steps S104 and S106 without any assistance from manually operations. Additionally, the initial extrinsic parameters are obtained by means of software over the simulated platform such that the simulated platform may automatically apply another software of operating alignments between the coordinate system of fisheye-lens camera and world coordinate system to make transformations between these two coordinate systems correctly. Accordingly, the initial extrinsic parameters may be further optimized according to associated software of different applications. Detailed descriptions are given later.

Figure 2A:
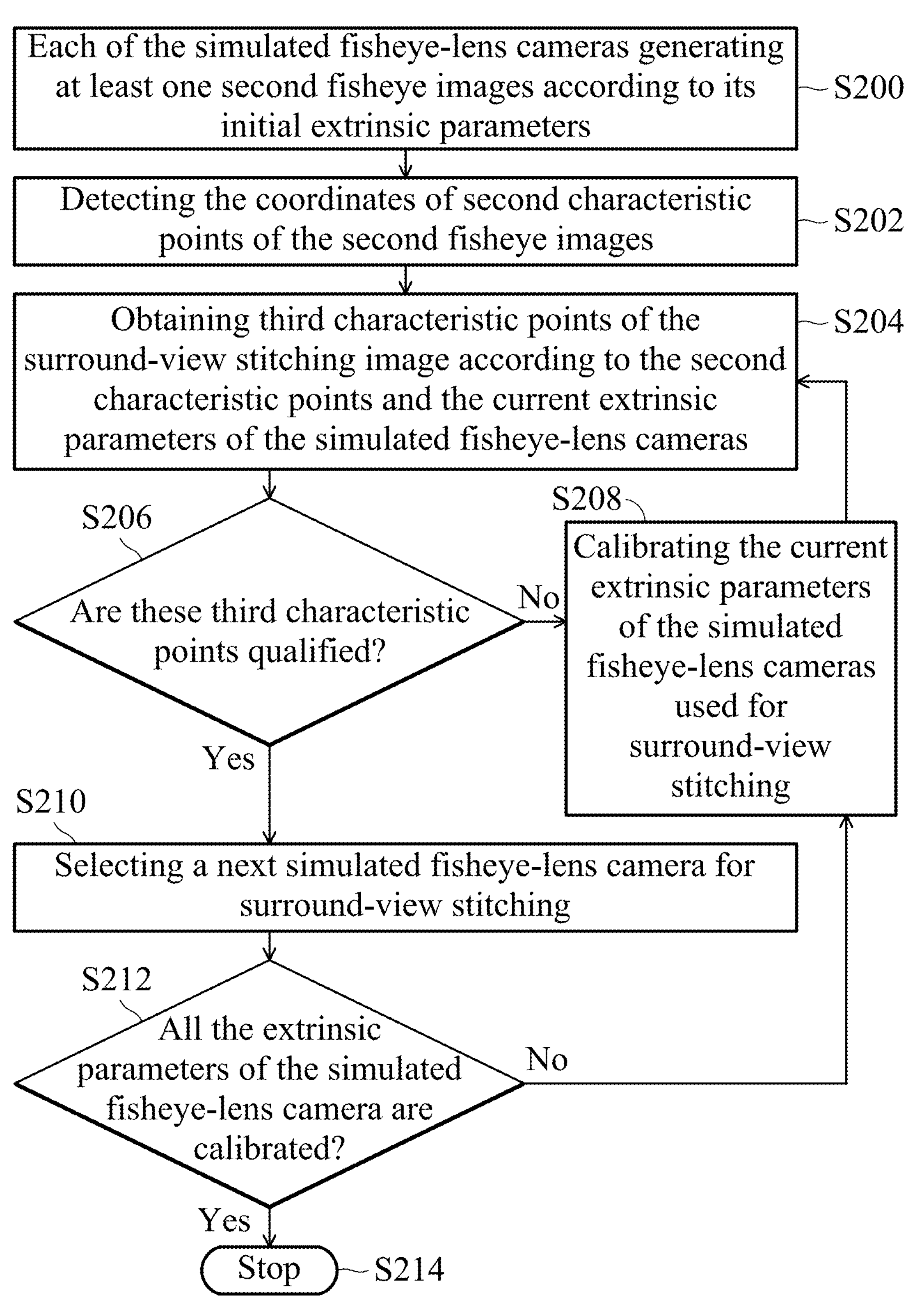
FIG. 2A is a flow diagram of online optimizing the extrinsic parameters of fisheye-lens cameras for vehicle-surround-view systems.
Figure 2B:
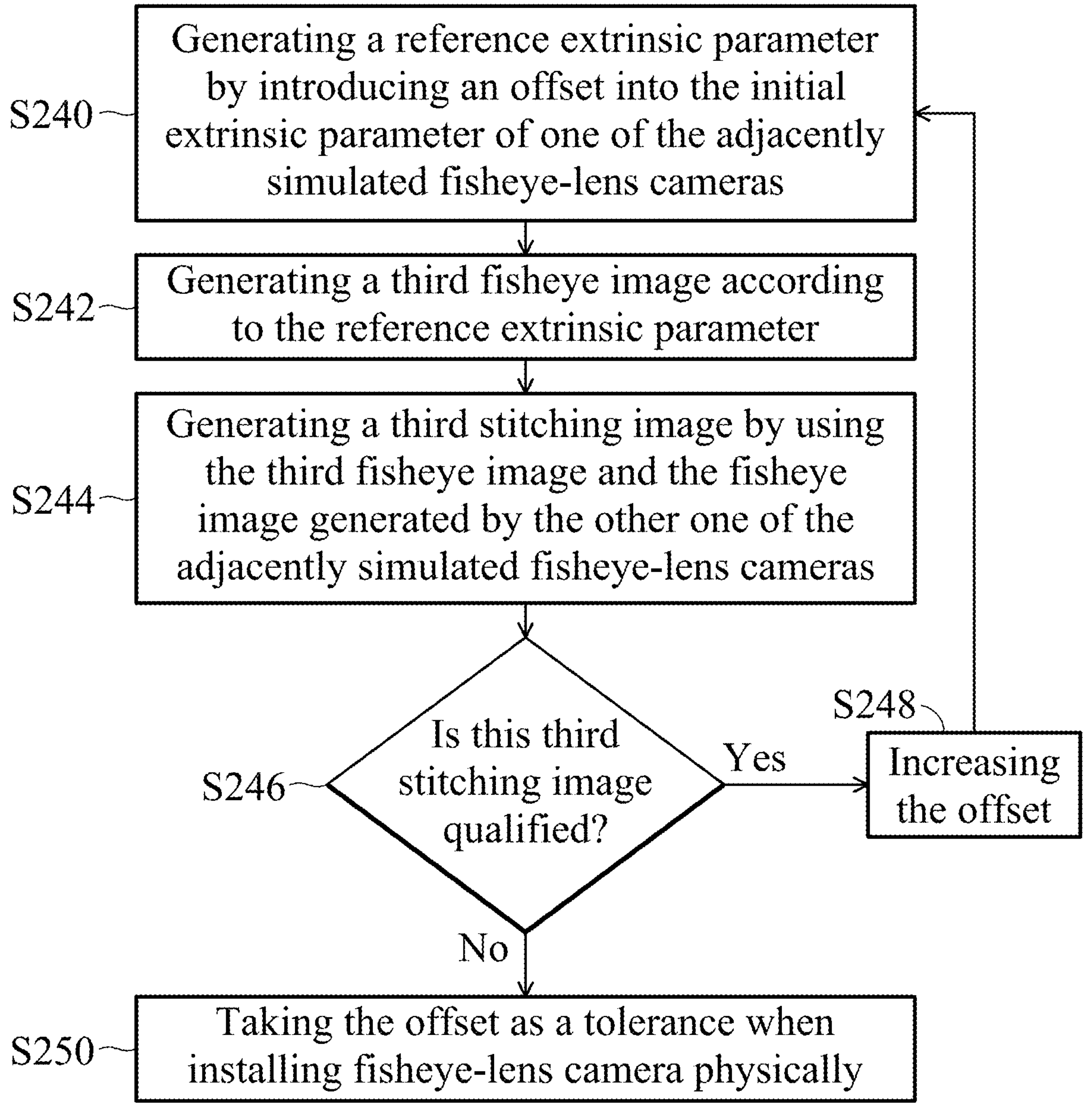
FIG. 2B is a flow diagram of deriving installation tolerances as the references of installing the fisheye-lens cameras on a vehicle, wherein the reference extrinsic parameters of FIG. 2B are obtained by introducing an offset into the initial extrinsic parameters or the optimized extrinsic parameters.
Figure 5A:
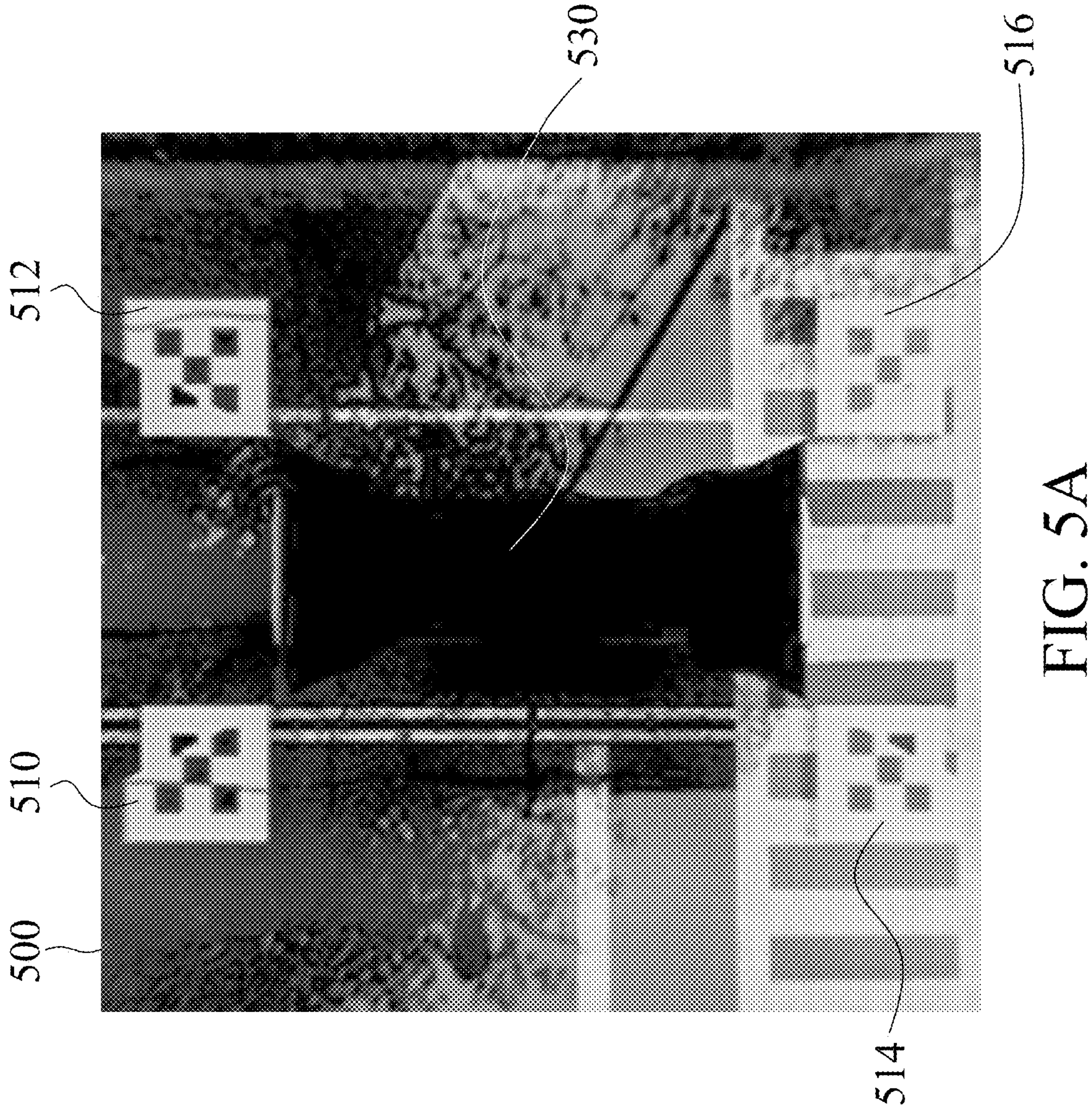
FIG. 5A is a schematic diagram of a stitching image 500 showing checkerboard calibration plates therein, wherein the extrinsic parameters of the fisheye-lens cameras are not optimized.
Figure 5B:
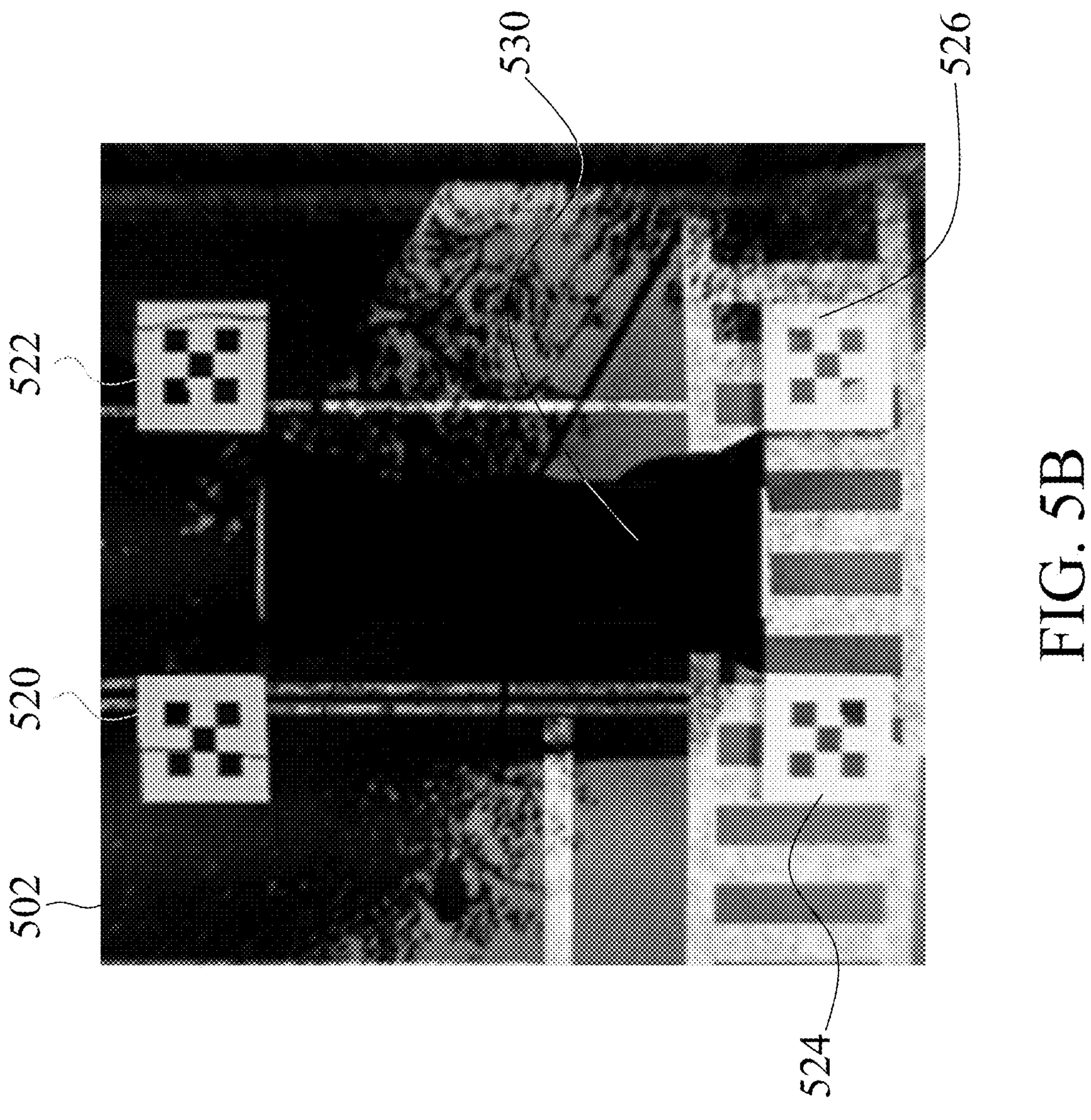
FIG. 5B is a schematic diagram of a stitching image 502 showing checkerboard calibration plates therein, wherein the extrinsic parameters of the fisheye-lens cameras are optimized.
Figure 6A:
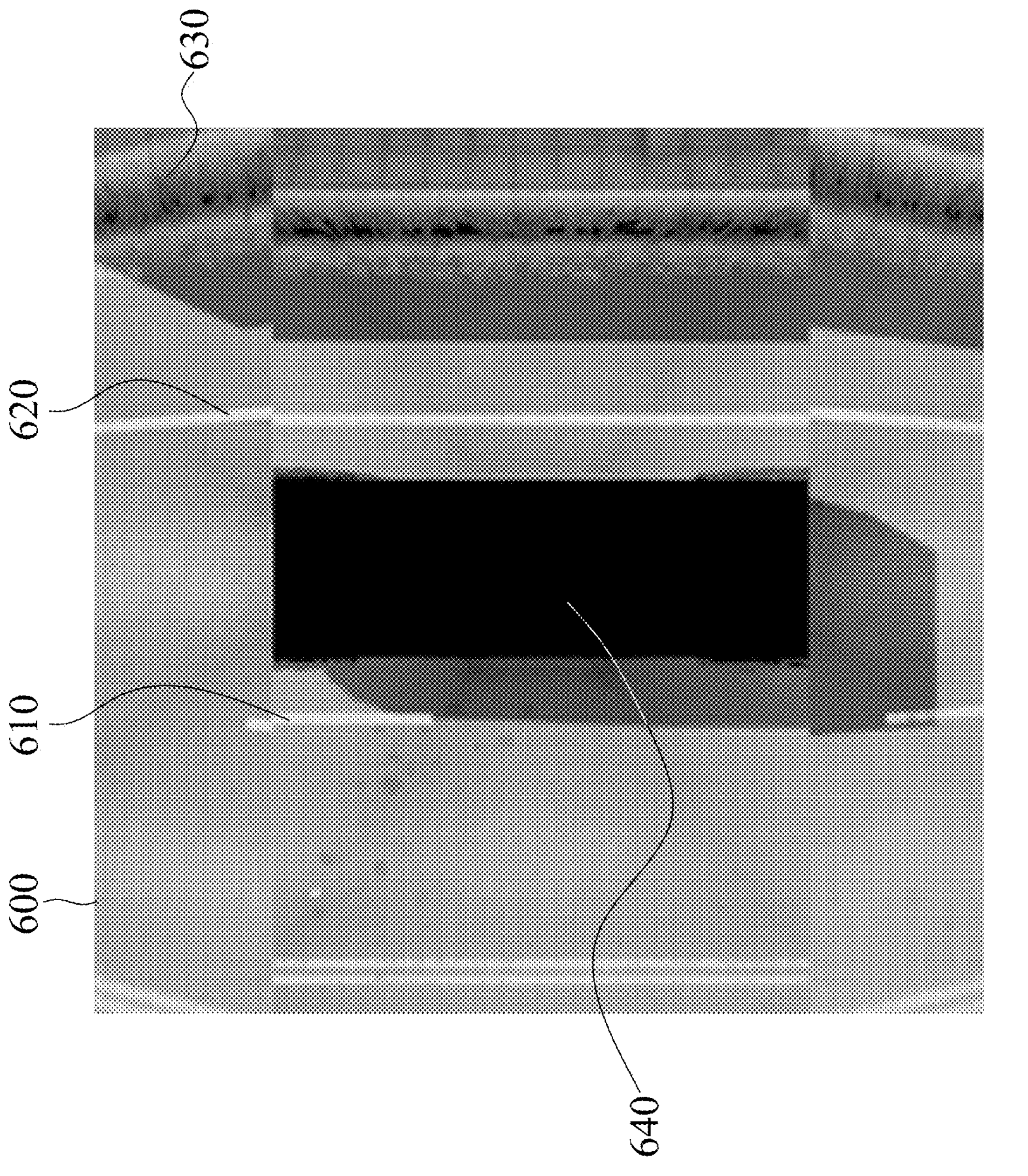
FIG. 6A shows a stitching image 600 without showing any checkerboard calibration plate therein, wherein the extrinsic parameters of the fisheye-lens cameras are not optimized.
Figure 6B:
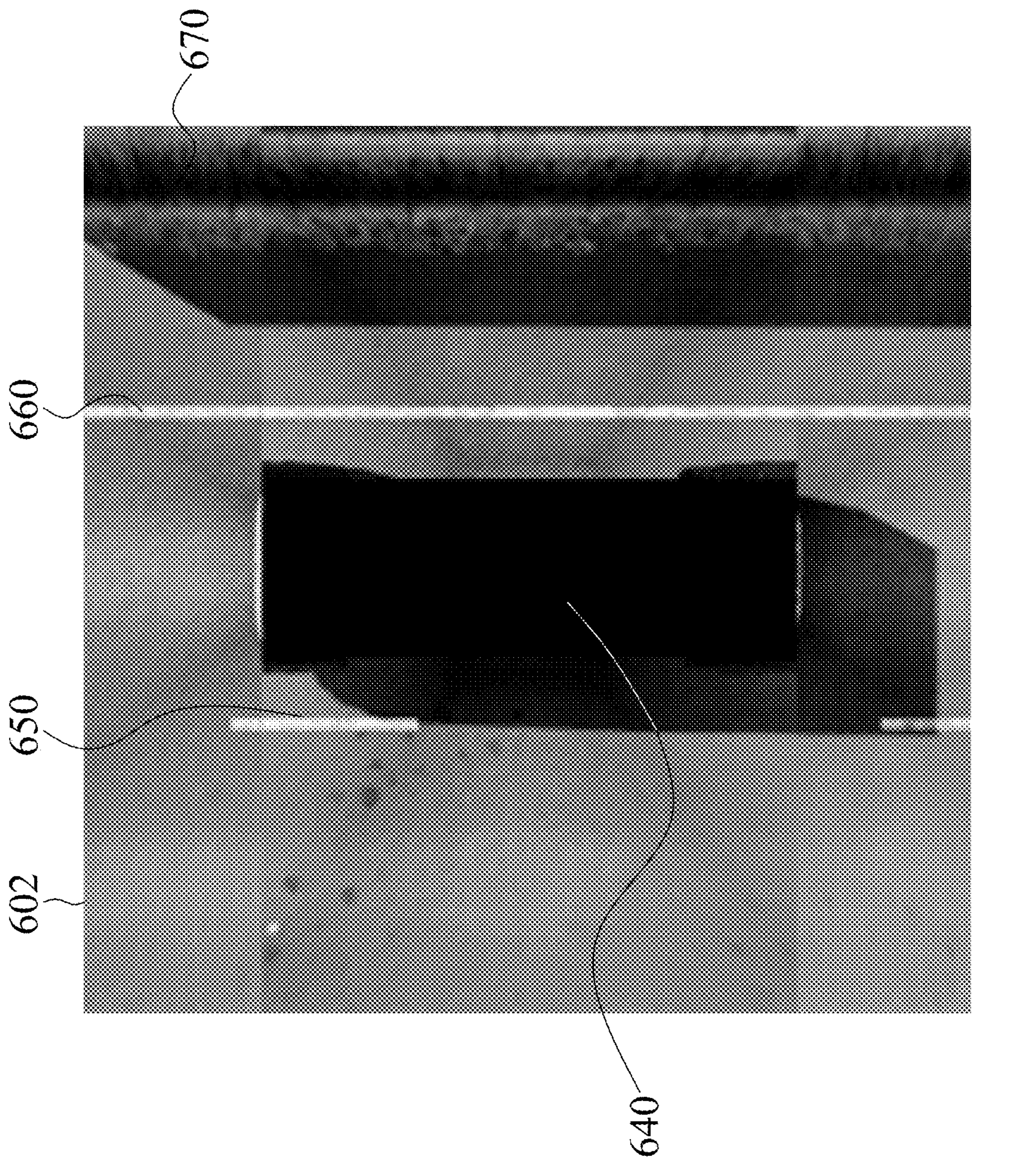
FIG. 6B shows a stitching image 602 without showing any checkerboard calibration plate therein, wherein the extrinsic parameters of the fisheye-lens cameras are optimized.
Figure 7:
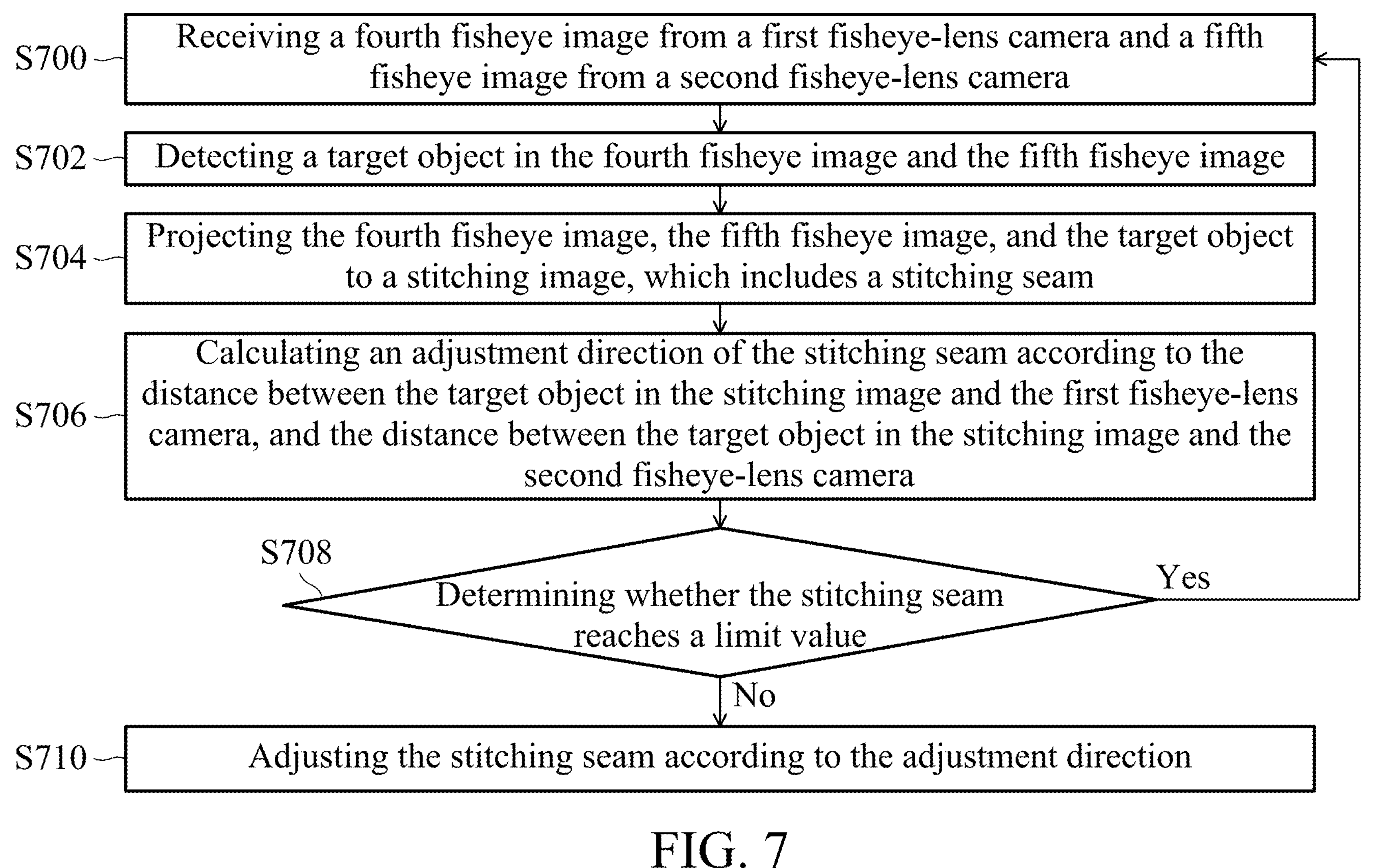
FIG. 7 is a flow diagram of adjusting a stitching seam of surround-view in accordance with the present invention.

The initial extrinsic parameters of each of the fisheye-lens cameras disposed on the simulated vehicle obtained in FIG. 1 may be calculated according to the fisheye image generated by itself. Since the coordinates of the checkerboard calibration plate are known by the simulation platform (i.e., the coordinates of the checkerboard calibration plate are determined after it is placed), the simulation platform may refer to the world coordinate system to calculate the distance between the checkerboard calibration plate and the fisheye-lens camera. For example, the initial extrinsic parameters of the front fisheye-lens camera of a four-camera vehicle may be calculated by using interior vertex points of the checkerboard calibration plate(s) (having 5×5 chessboard, exemplarily) shown in its fisheye image with the references of the world coordinate system. Because the coordinates of these interior vertex points are already known by the simulated platform (i.e., the positions of these interior vertex points are confirmed after the checkerboard calibration plate(s) is(are) placed), the displacement and tilts/roll of this front fisheye-lens camera may be found and then converted as matrices (vectors) for further operations. Descriptions about exemplarily extrinsic parameters will be given later (e.g., rotation matrix and transform matrix shown in paragraphs [0052]). As informed aforementioned, correct alignments between fisheye-lens camara and world coordinate systems is very important for generating surround-view stitching images; otherwise, those stitching images may comprise errors or discontinuous sections therein. For example, FIGS. 5A and 6A are stitching images generated by fisheye-lens cameras under non-aligned coordinate systems, while 5B and 6B show stitching images generated by fisheye-lens cameras under correctly aligned coordinate systems. The surround-view effects of the FIGS. 5B and 6B are obvious better than that of the FIGS. 5A and 6A. After the coordinate systems have been aligned accurately, starting from the initial extrinsic parameters, the extrinsic parameters of the fisheye-lens cameras of the vehicle-surround-view systems may be optimized by optimizing the stitching images derived from the second fisheye images generated from the fisheye-lens cameras. FIG. 2A and associated descriptions will be given to illustrate the extrinsic-parameter optimization processes. On the other hand, the initial extrinsic parameters may add offset(s) as reference extrinsic-parameters and then introduce into the extrinsic-parameter optimization processes so as to obtain installation tolerances as the references while physically installing fisheye-lens cameras on vehicles. FIG. 2B is used to show the detailed processes of obtaining the reference extrinsic-parameters accompanied with relative descriptions. Moreover, because driving safety is a very serious concern for the vehicle-surround-view systems, the present disclosure particularly focuses on the situations that an object appears on the overlap regions of the stitching images. FIG. 7 and associated descriptions are given to show the detailed processes of providing more object information when they appear on the seam regions.

In step S100, the disclosed method establishes simulated checkerboard calibration plates under a simulation platform (such as Carla) according to the checkerboard characteristics (e.g., the patterns and sizes, . . . , etc.) of actual checkerboard calibration plates used in the real environment. After that, the disclosed method allocates the simulated checkerboard calibration plates surrounding the simulated vehicle under suitable distances in the simulation platform with the references of real vehicular dimension as well as actual environment of the dedicated place for calibrations. In some embodiments, the disclosed method provides a shortcut key in the user interface of the simulation platform to activating step S100. For example, if a shortcut key E is set for step S100, a user may click this shortcut key E in the simulation platform to invoke the operations of step S100 (e.g., the default/predetermined simulated checkerboard calibration plates are place surrounding the simulated vehicle if the shortcut key E is pressed/activated). Alternatively, step S100 may be written as a plug-in program or a *.dll file (dynamic link library file), and may be loaded for executions when a user activates step S100.

Since practically used checkerboard calibration plates may have different styles, sizes and patterns thereon, the disclosed method may build-in checkerboard calibration plates having different checkerboard characteristics within the simulation platform as selections of online calibrations. In some embodiments of step S100 in FIG. 1, each of the checkerboard calibration plate has a 5×5 chessboard (e.g., the side length of each small grid is 30.5 cm actually), and the disclosed method disposes four of such checkerboard calibration plates surrounding the simulated vehicle. If the center of the simulated vehicle is taken as the origin of the Cartesian coordinate system with the positive x-axis pointing the right of the simulated vehicle and the positive y-axis pointing to the front of the simulated vehicle, the coordinates of these four simulated checkerboard calibration plates may be, for example, (+4,+3), (−4,+3), (−4,−3), (+4,−3), wherein the coordinate unit is meters, but the present invention is not limited thereto. Additionally, if the direction pointing to the upper of the simulated vehicle is taken as the positive z-axis of the Cartesian coordinate system, a vehicle coordinate system having x/y/z directions may be defined, and this vehicle coordinate system may be used as the world coordinate system for optimizing the extrinsic parameters of the fisheye-lens cameras of the vehicle-surround-view systems.

In some embodiments, the disclosed method stores intrinsic parameters of each of the fisheye-lens cameras intended to be mounted on the vehicle in the real world. In some embodiments, there may be four or six simulated fisheye-lens cameras mounted on the simulated vehicle, but the present invention is not limited thereto. In some embodiments, for a four-camera vehicle, those four fisheye-lens cameras may be installed on the front, rear, left, and right sides of the simulated vehicle. If a six-camera vehicle is selected, the fisheye-lens cameras may be respectively installed on the front, left-front, left-rear, rear, left-right, and right-front sides of the simulated vehicle. In some embodiments, the intrinsic parameters of a fisheye lens may include its focal length, optical center, and lens distortion, but the present invention is not limited thereto. In step S102, the disclosed method establishes a plurality of simulated fisheye-lens cameras in the simulation environment based on associated intrinsic parameters in the real world and then mounted them on a simulated vehicle.

In some embodiments, the intrinsic-parameters of the simulated fisheye-lens cameras may be, for example, an intrinsic matrix K $$K = \begin{bmatrix} f_x & 0 & c_x \\ 0 & f_y & c_y \\ 0 & 0 & 1 \end{bmatrix}$$

wherein $f_x$=312.8667907714844, $f_y$=312.0426940917969, $c_x$=643.1307983398438, and $c_y$=366.03363037109377. The distortion coefficients of the simulated fisheye lenses may be, for example, a vector D $$D=[0.19537385, -0.09064766, 0.027709538, -0.0042501888]$$

The resolution of the fisheye image generated by the simulated fisheye-lens cameras according to the above intrinsic-parameters K and D may be, for example, 1280*720, but the present invention is not limited thereto.

In step S104, the disclosed method obtains the first fisheye images according to the simulated fisheye-lens cameras and stores them along predetermined storage path and frame rate. In some embodiments, the storage path, for example, may direct to a local disk directory. In some embodiments, the fisheye images may be stored under an image or a video format. In some embodiments, before calculating the initial extrinsic parameters regarding the simulated fisheye-lens cameras in step S106, the disclosed method firstly obtains the vehicular characteristics of the simulated vehicle associated with that in the real world (e.g., receives from user's inputs), which are then used to determine the initial positions and rotation angles of the simulated fisheye-lens cameras on the simulated vehicle. In some embodiments, these vehicular characteristics include vehicle dimensions (e.g., lengths, widths, heights, shapes, . . . , etc.), weights, speeds, and braking abilities, . . . , etc., but the present invention is not limited thereto. In some embodiments, the first fisheye images must include the checkerboard calibration plates and take the interior vertex points as the first characteristic points. In some embodiments, S106 will not be activated to find the initial extrinsic parameters unless the checkerboard calibration plates are shown in the first fisheye images. In such embodiments, the disclosed method will suspend/stop the flow of FIG. 1 and notify the user of his/her first fisheye images must show checkerboard calibration plates therein to find the initial extrinsic parameters.

The disclosed method disposes the simulated fisheye-lens cameras on the simulated vehicle according to the connection type indicated by the user in step S102. In some embodiments, the connection type is a rigid connection, such as such as fastening the fisheye-lens cameras at fixed positions by using screws, but the present invention is not limited thereto. Moreover, the disclosed method may provide a shortcut key in the user interfaces of the simulation platform to activate the step S104. Exemplarily, if a shortcut key Y is assigned for activating step S104, the user only needs to click this shortcut key Y to inform the disclosed method of performing the step S104 (e.g., the disclosed method may perform the step S102 to install the simulated fisheye-lens camera and store the first fisheye image in the predetermined storage path in step S104). Alternatively, step S104 may be written as a plug-in program or a *.dll file (dynamic link library file), and may be loaded for executions when a user activates step S104.

In step S106, the disclosed method calculates the initial extrinsic parameters of the simulated fisheye-lens cameras on the simulated vehicle according to the first fisheye images (e.g., calculating by using the Levenberg-Marquardt algorithm). In some embodiments, the initial extrinsic parameters of each of the simulated fisheye-lens cameras on the simulated vehicle may be converted from the camera coordinate system of the simulated fisheye-lens cameras ("camera coordinate system" for short) into a world coordinate system by means of associated rotation matrix and transform matrix (e.g., the Transform and Rotation matrices in paragraph [0056]), but the present invention is not limited thereto. In some embodiments, both of the rotation and transform matrices are included in the initial extrinsic parameters. In some embodiments, the disclosed method uses a checkerboard-calibration-plate-corner detection algorithm to detect the interior vertex points of the checkerboard calibration plates in the first fisheye images in step S104. Then, the disclosed method calculates the initial extrinsic parameters in step S106 according to the interior vertex points of the checkerboard calibration plates in both of the camera coordinate system and the world coordinate system. In some embodiments, the initial extrinsic parameters are converted as displacement and rotation angles associated with simulated fisheye-lens cameras, which are then converted as displacement and rotation angles associated with simulated vehicles.

In some embodiments, the disclosed method sets the positions and rotation angles of the simulated fisheye-lens cameras under the world coordinate system by means of the initial extrinsic parameters obtained from the fisheye-lens cameras in the real world, which is called method 1. In some embodiments, the disclosed method directly sets the positions and rotation angles of the simulated fisheye-lens cameras under the world coordinate system in the simulation platform (e.g., a user may assign his/her setting regarding the positions and rotation angles in the Carla system), which is called method 2. Taking method 1 and four simulated fisheye-lens-camera system as an example, the initial extrinsic parameters of the four simulated fisheye-lens-camera system may be, for example, as follows.

Transform (Location(x=1.700000, y=−0.090000, z=1.860000)); Rotation (pitch=0.000000, yaw=0.000000, roll=0.000000) . . . extrinsic parameter 1;

Transform (Location(x=−0.600000, y=−0.800000, z=1.860000)); Rotation (pitch=0.000000, yaw=−90.000000, roll=0.000000) . . . extrinsic parameter 2;

Transform (Location(x=−1.700000, y=0.000000, z=1.370000)); Rotation (pitch=0.000000, yaw=−180.000000, roll=0.000000) . . . extrinsic parameter 3;

Transform (Location(x=0.000000, y=0.590000, z=1.200000)); Rotation (pitch=0.000000, yaw=90.000000, roll=0.000000) . . . extrinsic parameter 4.

In the abovementioned extrinsic parameters 1 to 4, the unit of length is meter and the unit of angle is degree.

Figure 3:
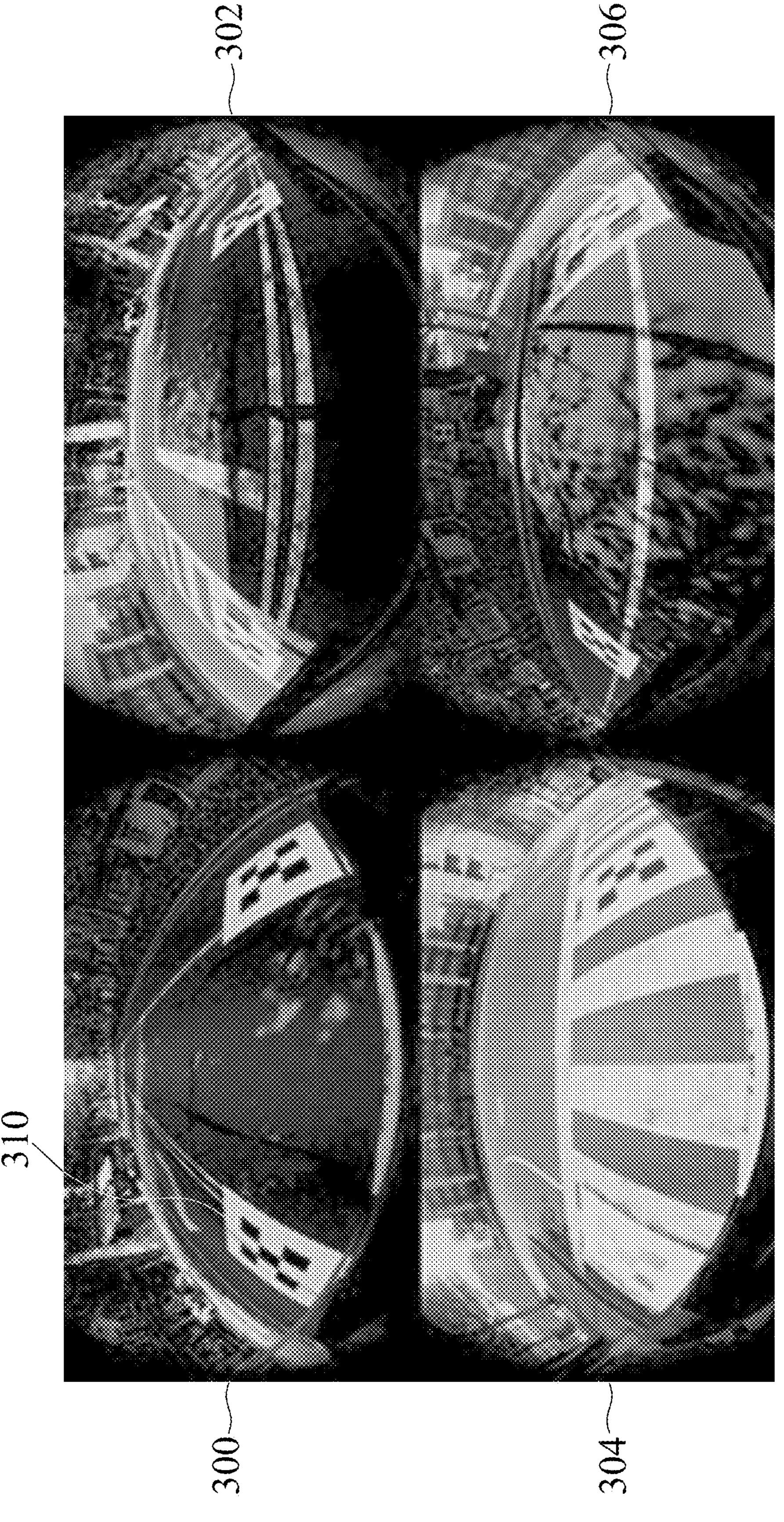
FIG. 3 is a schematic diagram illustrative of fisheye images showing checkerboard calibration plates therein.
Figure 4:
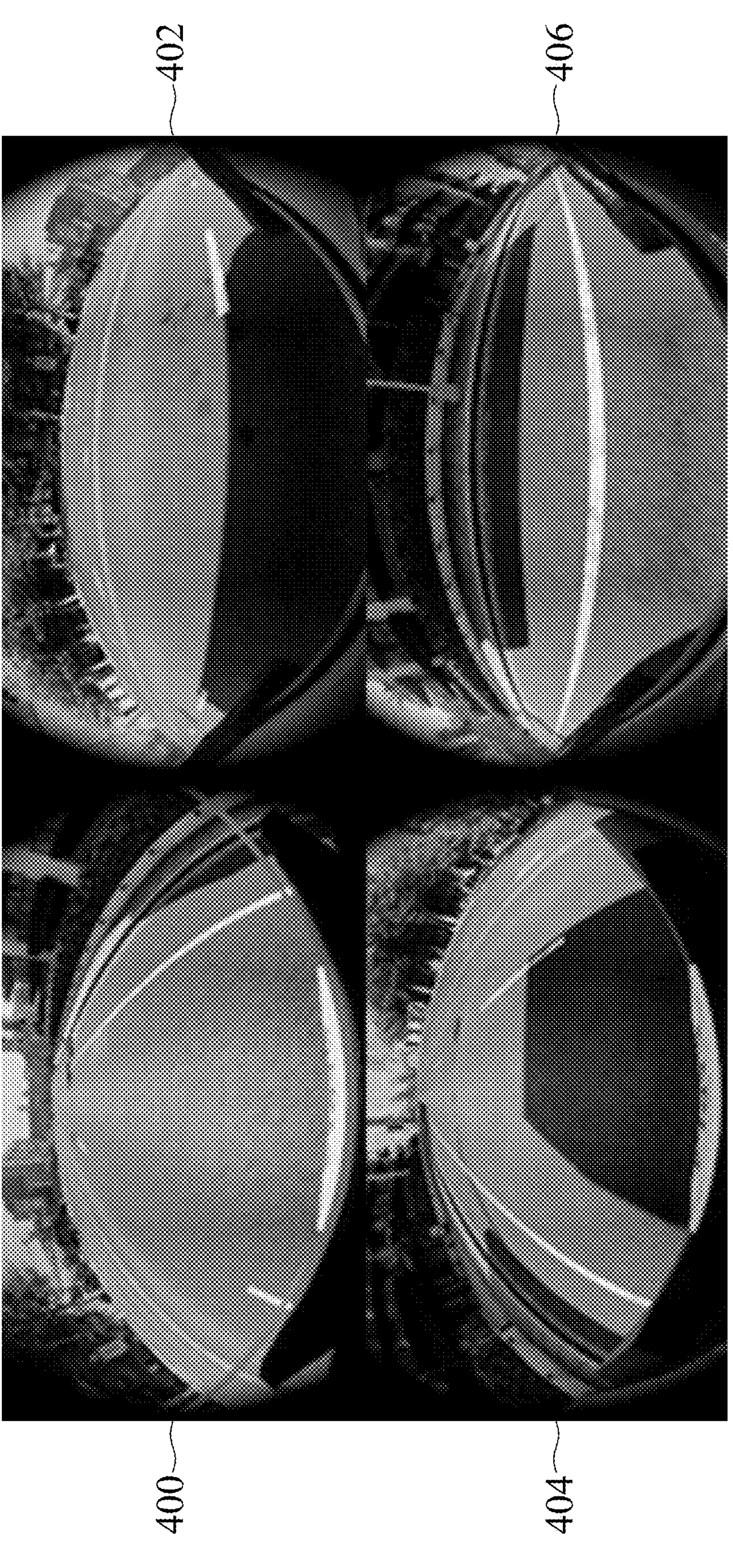
FIG. 4 is a schematic diagram illustrative of fisheye images without showing any checkerboard calibration plate therein.

In step S106, the disclosed method may further generate the first stitching image according to the first fisheye images for user's references. As aforementioned in paragraph [0048], the first stitching image may show the situation as that of FIGS. 5A/6A if the alignments between coordinate systems are inaccurate. In some embodiments, if he/she thought the first stitching image is correct or acceptable, he/she may skip the steps of aligning coordinate systems. Additionally, as illustrated in paragraph [0047], the simulated platform may invoke a software of aligning coordinate systems after the initial extrinsic parameters are found in step S106 (e.g., calling the projectPoints, solvePnP, Rodrigues . . . functions under OpenCV) to make the camera/world coordinate systems being aligned accurately (e.g., refining the Transform/Rotation matrices over the simulated platform by invoking the aforementioned software). Thereafter, those initial extrinsic parameters may be further optimized according to specific applications, such as the flow of FIG. 2A is invoked for optimizing the initial extrinsic parameters obtained by using FIG. 1 as the requirements of vehicle-surround-view systems. Detailed descriptions are given later. Moreover, in the aftermarkets, if a user wants to install fisheye-lens cameras on those vehicles without any fisheye-lens camera after factory release, he/she may establish a simulated vehicle be referring vehicular characteristics of those actual ones, mount simulated fisheye-lens cameras on this simulated vehicle, and then invoke the flow of FIG. 1 to generate needed initial extrinsic parameters of the fisheye-lens cameras by using the first fisheye images generated therefrom (e.g., those fisheye images as shown in FIG. 3). Finally, the user may install his/her fisheye-lens cameras by referring the initial extrinsic parameters. On the other hand, if fisheye-lens cameras have been installed on vehicles, fisheye images generated therefrom (e.g., those fisheye images as shown in FIG. 4) may be introduced into the simulated platform to re-optimize the extrinsic parameters of those mounted fisheye-lens cameras for their vehicle-surround-view systems (e.g., one of those fisheye-lens cameras may be impacted by forces such that its extrinsic parameters may be deviated from the original), but the disclosure does not limit thereto.

As aforementioned above, it is necessary to optimize the extrinsic parameters of those fisheye-lens cameras establishing vehicle-surround-view systems. The disclosed simulated platform performs online stitching-image optimizations for those fisheye-lens cameras disposed on vehicles so as to facilitate the establishments of vehicle-surround-view systems. FIG. 2A is a flow of optimizing the extrinsic parameters of the simulated fisheye-lens cameras mounted on the simulated vehicle in accordance with some embodiments of the present invention. As shown in FIG. 2A, the disclosed method comprises the following steps. Each of the simulated fisheye-lens cameras generates at least one second fisheye image based on its own initial extrinsic parameters (step S200), and the coordinates of the second characteristic points in the second fisheye images are detected (step S202). The third characteristic points are derived by using the second characteristic points according to the extrinsic parameters currently used by the simulated fisheye-lens cameras (step S204) and then the simulated platform verifies if the third characteristic points are qualified or not (e.g., the errors of the overlap regions of the stitching image is too large to be qualified) to determine if the current extrinsic parameters needs to be optimized again (step S206). If the third characteristic points are determined unqualified in step S206, the current extrinsic parameters are continuously optimized and then the flow returns to step S204 (step S208). If the third characteristic points are determined qualified in step S206, the extrinsic parameters of the next simulated fisheye-lens camera are selected (step S210) and then the flow returns step S208. However, the flow terminates if all the extrinsic parameters of the simulated fisheye-lens cameras haven been optimized (step S214).

In one embodiment, before implementing the step S200, the simulated platform may firstly perform the flow of FIG. 1 on the simulated fisheye-lens camera which does not have its initial extrinsic parameters. Additionally, the simulated platform may just need one second fisheye image from each of the fisheye-lens cameras in step S200 since the simulated platform is not affected by real environment. In one embodiment, the simulated platform may move the simulated vehicle or the simulated checkerboard calibration plates surround itself to generate a lot of second fisheye images showing the simulated checkerboard calibration plates under different positions and viewpoints if a user may want to collect a lot of second fisheye images from each of the fisheye-lens cameras (e.g., such as dynamic scenes like autonomous vehicles or robot navigations). Please note that the simulated platform may automatically generate the amount of second fisheye images indicated by a user after he/she indicates the moving distances of his/her simulated checkerboard calibration plates, or the distances and viewpoints of his/her simulated vehicles over the simulated platform. The disclosure does not limit thereto. The second characteristics points may be the edges of interior vertex points of the checkerboard calibration plates, or any identifiable textures (e.g., traffic lines or any recognizable objects) to make sure the mappings between the camera coordinate system and the world coordinate systems being aligned accurately. In some embodiments, if the second characteristics points are the edges of interior vertex points of the checkerboard calibration plates, a checkerboard-calibration-plate-corner detection algorithm is applied to detect the coordinates of the edges of interior vertex points under the camera coordinate system. There is no limit to the amount of the second fisheye images as well as what the second characteristic points are in the disclosure. Additionally, the second characteristic points may be detected by using many of the second fisheye images generated by a simulated fisheye-lens camera (e.g., the Gauss-Newton Algorithm). The disclosure is not limited thereto.

The third characteristic points in step S204 may be recognizable textures in the overlap regions (such as traffic lines). Additionally, the third characteristic points in step S204 are converted from the second characteristic points according to the aligned transformations between the camera coordinate systems and the world coordinate system under the extrinsic parameters currently used by the simulated fisheye-lens cameras of the vehicle-surround-view systems. Taking the fisheye images in FIG. 3/FIG. 4 as examples, if the second characteristic points are the edges of the checkerboard calibration plates/traffic lines in FIG. 3/FIG. 4, respectively, the third characteristics points are the edges of the checkerboard calibration plates/traffic lines of the top-down view images FIG. 5B/FIG. 6B. Obviously, the distorted in edges of the checkerboard calibration plates and traffic lines in FIGS. 3 and 4 are adjusted and correctly displayed in FIGS. 5B and 6B. Before stitching images in step S204, the simulated platform compares and aligns the overlap regions of adjacent fisheye images and then stitches them together as a stitching image. The approach of verifying the third characteristics points are qualified in step S206 may verify if the third characteristics points are aligned correctly, which may be achieved by determining if the errors of the overlap regions is higher/larger than predetermined stitching-error thresholds. Additionally, if the errors of the overlap regions is determined higher than predetermined stitching-error thresholds in step S206, the current extrinsic parameters of the simulated fisheye-lens cameras (which may be the initial extrinsic parameters or the previously optimized extrinsic parameters) may be further optimized by optimizing the stitching image generated therefrom (e.g., refining the Transform/Rotation matrices to fine-tune the displacements and rotation angles) and then returns to step S204 to obtain the third characteristic points again, but the disclosure is not limited thereto. In one embodiment, before selecting the next simulated fisheye-lens camera for stitching images in step S210, the simulated platform may optimize the current stitching image, including re-projection-error minimizations (by using bundle adjustments), color/brightness adjustments (e.g., because colors and brightness of the adjacent fisheye images may be different), smooth transitions to remove jagged edges or inconsistences of the seam regions, but the disclosure is not limited thereto. Taking a four-camera vehicle as examples to illustrate the way of selecting the next simulated fisheye-lens camera in step S212, wherein the four simulated fisheye-lens cameras are the front/left/back/right cameras under counter-clockwise direction, and are designated with numbers 1/2/3/4, respectively. The simulated fisheye-lens cameras 1/2 (front/left) are firstly selected for extrinsic-parameter optimizations by optimizing the stitching image generated from their fisheye images, and then the simulated fisheye-lens cameras 2/3 (left/rear), 3/4 (rear/right), 4/1 (right/front) are consecutively selected for stitching-image optimizations. The flow goes to step S214 to terminate the extrinsic-parameter optimization processes if all extrinsic parameters of these four simulated fisheye-lens cameras are optimized. In some embodiments, the simulated platform does not optimize any stitching image made by any adjacently simulated fisheye-lens cameras (e.g., made by the simulated fisheye-lens cameras 2/3), but optimize the stitching image made by all of the simulated fisheye-lens cameras after all their extrinsic parameters have been optimized.

For those vehicles that do not install any fisheye-lens camera after factory release, it is necessary to find proper positions for disposing fisheye-lens cameras and then optimize extrinsic parameters of those fisheye-lens cameras installed thereon so as to establish their own vehicle-surround-view systems. If the extrinsic-parameter optimization processes need to be performed on a lot of such vehicles under an identical model, it will be very inefficient for offline installations/optimizations because those processes of obtaining required initial extrinsic parameters and kicking-off the consecutive extrinsic-parameter optimization processes should be repeatedly performed on every vehicle. On the contrary, it is advantageous for a user to obtain required initial extrinsic parameters and to optimize them as optimized extrinsic parameters over the disclosed simulated platform, such that he/she may install fisheye-lens cameras on every vehicle (under the identical model) by referring the extrinsic parameters obtained from the simulated platform without applying conventionally offline cumbersome and time-wasting processes. Additionally, anytime when a fisheye-lens camera is deflected by an external force (e.g., someone unintentionally or accidentally touches the fisheye-lens camera and causes this fisheye-lens camera having deflections), the vehicle-surround-view system may show their stitching images as that of FIG. 5A or 6A. However, if each of the fisheye-lens cameras on such a vehicle captures a fisheye image, and all those fisheye images are fed into the simulated platform to invoke the flow of FIG. 2A for re-optimizing their extrinsic parameters by means of stitching images optimizations. The vehicle-surround-view system may be re-optimized over the simulated platform to show accurate stitching images as that of FIG. 5B or 6B even one of its fisheye-lens cameras is still deflected. Moreover, the disclosed simulated platform may provide the original manufacturing firms vehicle-surround-view evaluations after installing fisheye-lens cameras on their vehicles. For example, once their vehicular characteristics are determined for a new-design vehicle, which may be fed into the simulation platform, and fisheye-lens cameras under different models may be selected and mounted on this new-design vehicle over the simulation platform to generate surround-view stitching images (since the simulation platform builds-in many intrinsic parameters of fisheye-lens cameras). The above processes may be repeatedly performed until a specific model of fisheye-lens camera providing the optimized surround-view is found. Accordingly, the vehicle-surround-view systems may be optimized efficiently as long as a user provides vehicular characteristics into the simulated platform, generate the initial extrinsic parameters of associated fisheye-lens cameras, and then calibrate them as required optimized extrinsic parameters. In some embodiments, if a user roughly knows the dimensions of his/her vehicle only, or may not input his/her vehicular characteristics into the simulated platform (e.g., this vehicle dimension is not finalized or the vehicle characteristics are confidential, . . . , etc.), he/she may select a simulated vehicle having similar vehicular characteristics as his/hers (e.g., he/she may select a simulated vehicle having the dimension the most similar to his/hers) on the simulated platform to generate initial extrinsic parameters based on this simulated vehicle. In some embodiments, a user may select any simulated vehicle he/she thought capable of generating initial extrinsic parameters (e.g., he/she may select a simulated vehicle having dimension larger than his/hers) to activate the following processes of generating the initial extrinsic parameters as well optimizing them.

Please note the processes of FIG. 1 (obtaining the initial extrinsic parameters of a fisheye-lens camera) and FIG. 2A (optimizing the extrinsic parameters of this fisheye-lens cameras for a vehicle-surround-view system) may be performed by invoking separate modules, such that the flow of FIG. 2A may be invoked on the simulated platform any time when a user wants to optimize the extrinsic parameters of his/her fisheye-lens cameras based on any object other than checkerboard calibration plates. Additionally, it is unnecessary for this user to reestablish the simulation environment (e.g., performing the steps of re-selecting the same place for simulations and placing the same simulated checkerboard calibration plates surround his/her simulated vehicle, . . . , etc.), but to optimize the extrinsic parameters with the references of those objects his/her vehicle may encounter when driving on the road (e.g., the traffic lines). Therefore, the flow of FIG. 2A may optimize the extrinsic parameters for the fisheye-lens cameras used for establishing vehicle-surround-view systems by using the fisheye images showing objects associated with simulated vehicles, e.g., pedestrians/crosswalks/traffic lines which garbage trunks may encounter when driving, or workers/walls/cranes which a mining vehicle may encounter at work. Moreover, for the embodiments incorporating the flows of FIGS. 1 and 2A together into an identical software module, the step S200 may be activated after step S106 directly. In such embodiments, the objects referring by the optimization flow of FIG. 2A may be checkerboard calibration plates. In some embodiments, the initial extrinsic parameters are used to setup the positions and rotation angles of the fisheye-lens cameras under the world coordinate system. In some embodiments, the world coordinate system is the coordinate system used for stitching surround-view images. Although FIG. 2A optimizes the extrinsic parameters for the fisheye-lens cameras of the vehicle-surround-view systems, there are lots of practical applications need the extrinsic parameters of their fisheye-lens cameras being optimized according to their requirements. Exemplarily, those applications may include (but do not limit to) object detection and recognition, 3D reconstruction, augmented reality (AR), machine vision and navigation, motion capture and pose estimation, simultaneous localization and mapping (SLAM), . . . , etc. Therefore, the initial extrinsic parameters derived by means of FIG. 1 may be used to invoke optimization software specially made for associated practical applications so as to online optimize the initial extrinsic parameters as the requirements of practical applications (e.g., the initial extrinsic parameters obtained from FIG. 1 may be optimized as the needs of 3D reconstruction by means of the optimization processes specially made for 3D reconstruction (i.e., this optimization processes are used to substitute for the flow of FIG. 2A)).

There may have deviations when the fisheye-lens cameras are physically installed on the vehicle. Accordingly, it is advantageous if there are installation tolerances for references when users physical dispose their fisheye-lens cameras on their vehicles. The inventors recognize such a need such that they disclose a method of deriving installation tolerances by using the aforementioned stitching-image optimization processes over the simulated platform as users' references. FIG. 2B is a flow diagram of deriving installation tolerances as the references of installing the fisheye-lens cameras on vehicles, wherein the reference extrinsic parameters are obtained by introducing an offset into the initial extrinsic parameters or the optimized extrinsic parameters. FIG. 2B includes the following steps. An offset is introduced into the initial extrinsic parameters (or the optimized ones processed by FIG. 2A) of one of two adjacent simulated fisheye-lens cameras as the reference extrinsic parameters (step S240), and the simulated platform generates a third fisheye image according to the reference extrinsic parameters (step S242). This third fisheye image are used to generate a third surround-view stitching image with the fisheye image generated from the other one of two adjacent simulated fisheye-lens cameras (which does not introduce the offset into its initial (or optimized) extrinsic parameters) (step S244). The simulated platform determines if the third surround-view stitching image is qualified or not (step S246). The simulated platform increases the offset with an increment if the third surround-view stitching image is determined qualified (step S248). And, the simulated platform returns to step S240 to introduce this incremental offset into one of these two adjacent simulated fisheye-lens cameras to generate an updated third fisheye image, and incorporates with the fisheye image generated from the other one of two adjacent simulated fisheye-lens cameras (which does not introduce the incremental offset into its initial (or optimized) extrinsic parameters) to derive an updated third surround-view stitching image. If the third surround-view stitching image is determined unqualified in step S246, the offset being introduced into the initial extrinsic parameters is output as the installation tolerance for users' installation references (step S250). Please note the installation tolerance may be generated automatically after the offset and increment are indicated by users in the simulated platform.

Now taking 4-camera vehicle in paragraph [0061] as the example for demonstrating the way of introducing the offset into the initial extrinsic parameters of one of two adjacent fisheye-lens cameras in step S240. Because the simulated fisheye-lens cameras 1/2 (front/left cameras) are two adjacent fisheye-lens ones, the offset may be introduced into the initial extrinsic parameters of the simulated fisheye-lens camera 1 (front camera) as the reference extrinsic parameters in step S240, while the initial extrinsic parameters of the simulated fisheye-lens camera 2 (left camera) keep unchanged. This reference extrinsic parameters are used to generate the third surround-view stitching image, whose errors in its overlap regions will be larger than that made by no offset is introduced into these two adjacent simulated fisheye-lens cameras. If the errors are determined less than a predetermined overlap-region threshold in step S246, the flow goes to the step S248 to increase the offset with a predetermined incremental and then returns to the step S240 to re-generate a surround-view stitching image again.

In some embodiments, the installation tolerances derived from the reference extrinsic parameters may be useful references for specific applications. For example, if a user wants to attach protective housings to cover his/her fisheye-lens cameras installed on his/her vehicle (e.g., those fisheye-lens cameras installed on a mining vehicle may need protective housings to avoid damages caused by falling rocks), the tolerances may be his/her thickness references in selecting protective housings (e.g., the thicknesses of his/her protective housings are smaller than the installation tolerances). In some embodiments, the simulated platform may automatically derive the installation tolerances after users indicates his/her way of increasing the offsets. In some embodiments, the approaches of increasing the offset in step S248 may move/rotate the fisheye-lens cameras predetermined values, such as moving 0.1 cm or rotating 0.05° each time. In some embodiments, the offset may indicate only one of the adjacent cameras to move 0.1 cm without any rotations, or to rotate 0.05° without any displacement during each iteration. And, the installation tolerances regarding rotations may be skipped until the displacement installation tolerances are obtained, and vice versa. In some embodiments, both of the displacements and rotation angles may introduce offsets (e.g., the indicated simulated fisheye-lens camera may move 0.1 cm as well as rotating 0.05° in each iteration. In another embodiments, offsets may be introduced to yaw, roll, and/or pitch axes. In yet another embodiments, the reference extrinsic parameters derived in step S250 may be show as the initial extrinsic parameters±1 cm (the displacement installation tolerance) and ±0.5° (the rotation installation tolerance), but the disclosure is not limited thereto. In some embodiments, random noises may be introduced into the initial extrinsic parameters to generate the reference extrinsic parameters to simulate the displacement/rotation deflections when disposing fisheye-lens cameras on vehicles physically. Practically, the simulated platform may regenerate a larger random noise if the current one which the simulated platform plans to introduce into the initial extrinsic parameter is smaller than the previous one being introduced into the initial extrinsic parameter. In some embodiments, only the simulated platform recognize the actual amounts of the reference extrinsic parameters (because the simulated platform is aware of the amounts of random noise it introduces into the initial extrinsic parameters).

FIG. 3 shows a diagram of fisheye images including checkerboard calibration plates in accordance with some embodiments of the present invention. FIG. 3 includes fisheye images 300, 302, 304, and 306. In some embodiments, the fisheye image 300 may be from the front fisheye-lens camera of the simulated vehicle, the fisheye image 302 may be from the right fisheye-lens camera of the simulated vehicle, the fisheye image 304 may be from the rear fisheye-lens camera of the simulated vehicle, and the fisheye image 306 may be from the left fisheye-lens camera of the simulated vehicle, but the present disclosure is not limited thereto. As shown in FIG. 3, the fisheye images 300, 302, 304, and 306 all includes at least one checkerboard calibration plates 310. Therefore, the disclosed method may respectively calculate the initial extrinsic parameters for these four simulated fisheye-lens cameras by using the interior vertex points of the checkerboard calibration plates shown in the fisheye images 300, 302, 304, and 306 in step S106 of FIG. 1 (i.e., those interior vertex points may be the first characteristic points of FIG. 1). Please note each of the fisheye image of FIG. 3 may be used for respectively calculating the initial extrinsic parameters of the simulated fisheye-lens cameras by means of FIG. 1, and they may be collectively used to optimize the extrinsic parameters for those fisheye-lens cameras of the vehicle-surround-view systems by means of FIG. 2A. Accordingly, under the situation each fisheye-lens cameras provides a single fisheye image, the simulated platform is capable of generating the initial extrinsic parameters for each of the fisheye-lens cameras as well as of optimizing their extrinsic parameters for the vehicle surround-view systems they established, simultaneously.

FIG. 4 is a schematic diagram of a fisheye images having no checkerboard calibration plate in accordance with some embodiments of the present invention. FIG. 4 includes fisheye images 400, 402, 404, and 406. In some embodiments, the fisheye images 400, 402, 404, 406 may be respectively from the front, right, rear, and left fisheye-lens camera of the simulated vehicle, but the disclosure is not limited thereto. As shown in FIG. 4, all of the fisheye images 400, 402, 404, and 406 do not show any of the checkerboard calibration plate 310 therein, such that the disclosed method is unable to calculate the initial extrinsic parameters of the simulated fisheye-lens cameras by using the interior vertex points of the checkerboard calibration plates, but needs to employ other approaches for deriving the initial extrinsic parameters (e.g., if each of the fisheye-lens cameras is capable of providing a lot of fisheye images respectively generated under different angles, a SIFT (Scale-Invariant Feature Transform) algorithm may be employed on those fisheye images to derive required initial extrinsic parameters). However, the disclosed method may optimize the extrinsic parameters for those simulated fisheye-lens cameras of the vehicle-surround-view systems by employing the fisheye images 400, 402, 404, and 406 collectively under the extrinsic-parameter optimization processes of FIG. 2A.

FIG. 5A shows a stitching image 500 comprising the checkerboard calibration plates, wherein the extrinsic parameters of the fisheye-lens cameras are not optimized because the camera coordinate system is out of alignment with the world coordinate system. In FIG. 5A, the stitching image 500 includes a simulated vehicle 530, checkerboard calibration plates 510, 512, 514, and 516. In some embodiments, the checkerboard calibration plate 510 is disposed on the left front side of the simulated vehicle 530, the checkerboard calibration plate 512 is disposed on the right front side of the simulated vehicle 530, the checkerboard calibration plate 514 is disposed on the left rear side of the simulated vehicle 530, and the checkerboard calibration plate 516 is disposed on the right rear side of the simulated vehicle 530, but the disclosure is not limited thereto. As shown in FIG. 5A, the stitching effect of the stitching image 500 is not ideal (due to the out of alignment between the camera/world coordinate systems) because all the checkerboard calibration plates 510, 512, 514, and 516 comprise discontinuous sections therein.

FIG. 5B illustrates a stitching image 502 comprising the checkerboard calibration plates, wherein the extrinsic parameters of the fisheye-lens cameras are optimized such that the camera/world coordinate systems are aligned accurately. As shown in FIG. 5B, the stitching image 502 includes the simulated vehicle 530, a checkerboard calibration plates 520, 522, 524, and 526. In some embodiments, the checkerboard calibration plate 520 is placed on the left front side of the simulated vehicle 530, the checkerboard calibration plate 522 is placed on the right front side of the simulated vehicle 530, the checkerboard calibration plate 524 is placed on the left rear side of the simulated vehicle 530, and the checkerboard calibration plate 526 is placed on the right rear side of the simulated vehicle 530, but the disclosure is not limited thereto. Since the stitching image 502 are made under accurately aligned camera/world coordinate systems, as shown in FIG. 5B, all of the checkerboard calibration plates 520, 522, 524, and 526 have no discontinuous section therein. The stitching effect of the stitching image 502 is significantly better than that of the stitching image 500 in FIG. 5A.

FIG. 6A shows a stitching image 600 without including any checkerboard calibration plate, wherein the extrinsic parameters of the fisheye-lens cameras are not optimized because their camera/world coordinate systems are out of alignment. As shown in FIG. 6A, the stitching image 600 comprises a simulated vehicle 640, marking lines 610 and 620, and an object 630. In some embodiments, the marking line 610 is located on the left side of the simulated vehicle 640, and the marking line 620 and the object 630 are located on the right side of the simulated vehicle 640, but the disclosure is not limited thereto. It is obvious that the stitching effect of FIG. 6A is not ideal since the marking lines 610 and 620, and the object 630 all include discontinuous sections (due to the out of alignment between their camera/world coordinate systems).

FIG. 6B is stitching image 602 without including any of the checkerboard calibration plates, wherein the extrinsic parameters of the fisheye-lens cameras are optimized because their camera coordinate systems are in alignment with the world coordinate system. As shown in FIG. 6B, the stitching image 602 includes the simulated vehicle 640, marking lines 650 and 660, and an object 670. In some embodiments, the marking line 650 is located on the left side of the simulated vehicle 640, and the marking line 660 and the object 670 are located on the right side of the simulated vehicle 640, but the disclosure is not limited thereto. As shown in FIG. 6B, after their camera/world coordinate systems are correctly aligned, the stitching effect of the stitching image 602 is significantly better than that of the stitching image 600 in FIG. 6A because all of the marking lines 650 and 660, and the object 670 have no discontinuous section therein.

FIG. 7 is a flow diagram illustrative of a stitching-seam adjusting method when there is an object in the seam regions. The surround-view stitching image may real-time show the real scene surrounding a vehicle for driver's references. Because the position of the stitching seam is fixed in the conventional vehicle-surround-view system, there may be insufficient or even no information for drives' references if an object appears in the seam regions, which may thus cause traffic accidents. The inventors have recognized this disadvantage such that they propose an approach of providing sufficient information of any object appearing in the seam regions of the surround-view system for vehicle driver's references. FIG. 7 encompasses the following steps. A fourth fisheye image from a first fisheye-lens camera and a fifth fisheye image from a second fisheye-lens camera are received (step S700) and a target object is then detected in the fourth fisheye image as well as in the fifth fisheye image (step S702). The fourth fisheye image, the fifth fisheye image, and the target object are projected to a stitching image having a stitching seam, while the target object appears in the seam regions of the stitching image (step S704). An adjustment direction of the stitching seam is calculated according to the distance between the target object and the first fisheye-lens camera in the stitching image, and the distance between the target object and the second fisheye-lens camera in the stitching image (step S706). It is determined whether the stitching seam reaches a limit value (step S708) and the stitching seam is adjusted according to the adjustment direction (step S710). In some embodiments, the first fisheye-lens camera in step S700 is adjacent to the second fisheye-lens camera such that the target object is shown in both of the fourth/fifth fisheye images. In some embodiments, the target object is a concrete object (e.g., a bus). In some embodiments, the fourth fisheye image in step S700 is projected to the left side of the stitching image in step S704, the fifth fisheye image in step S700 is projected to the right side of the stitching image in step S704, and the stitching seam in step S704 is positioned between the fourth fisheye image and the fifth fisheye image within their stitching image, but the disclosure is not limited thereto. Some information provided from the fourth/fifth fisheye images is discarded during image stitching processes. For example, the information of the fourth fisheye image beyond the right side of the stitching seam and the information of the fifth fisheye image beyond the left side of the stitching seam is discarded without showing in their stitching image. Therefore, only portions or even none of the target object is shown in the stitching image because the stitching seam keeps unchanged. However, a vehicle driver is capable of preventing himself/herself from traffic accidents if the discarded information is recollected and shown for his/her references. The surround-view stitching images stitches fisheye images by referring the overlap regions of associated fisheye images, and there will exist a stitching seam (which is not shown in those actual stitching images) therein. The pixel information of both sides of the stitching seam are basically provided by different fisheye images, such that the stitching image shown different contents on its seam regions if its stitching seam is adjusted (e.g., adjusting the stitching seam to let those pixels of the fisheye image having more information regarding this target object being shown in the stitching image). Accordingly, the direction of the stitching seam is determined in step S706 according to determination about which one of two adjacent fisheye-lens cameras owns more object information, and then the direction of the stitching image is adjusted to show more object information in its seam regions for drivers' references.

In some embodiments, the limit value in step S708 is associated with the extrinsic parameters of the fourth and fifth fisheye-lens cameras, such as the imaging-range constrained by their physically installed positions, rotation angles, and the field of view (FOV), . . . , etc. In some embodiments, the method for adjusting stitching seams in FIG. 7 may be verified on the simulation platform (for example, Carla) in FIG. 1, but the present invention is not limited thereto. In step S708, when the disclosed stitching-seam adjusting method determines that the stitching seam reaches the limit value, it returns to step S700 to receive a six fisheye image from the first fisheye-lens camera and a seventh fisheye image from the second fisheye-lens camera. In some embodiments, the surround-view stitching image is depicted through drawing software from OPENGL (Open Graphics Library). Jagged edges or other errors may occur when the stitching seam reaches the limit value (for example, the slope of the stitching seam is too large) because both of the first/second fisheye-lens cameras are unable to provide pixel information regarding the target object. In step S708, when the stitching seam does not reach the limit value the disclosed stitching-seam adjusting method executes step S710 to adjust the stitching seam according to the adjustment direction obtained in step S706. In some embodiments, when no target object is detected in step S702, the disclosed stitching-seam adjusting method does not perform subsequent steps. Please note the disclosed stitching-seam adjusting method generates the surround-view stitching image whose stitching seam remains the previous slope for vehicle driver's references if the limit value is achieved. Additionally, the slope of the stitching seam returns to the original before stitching-seam adjusting after the target object leaves the seam regions. It is advantageous to real-time show more information regarding the target object appearing in the seam regions to vehicle drivers to avoid traffic accidents, and to return to the original slope to show the vehicle drivers the optimized surround-view stitching image.

Figure 8:
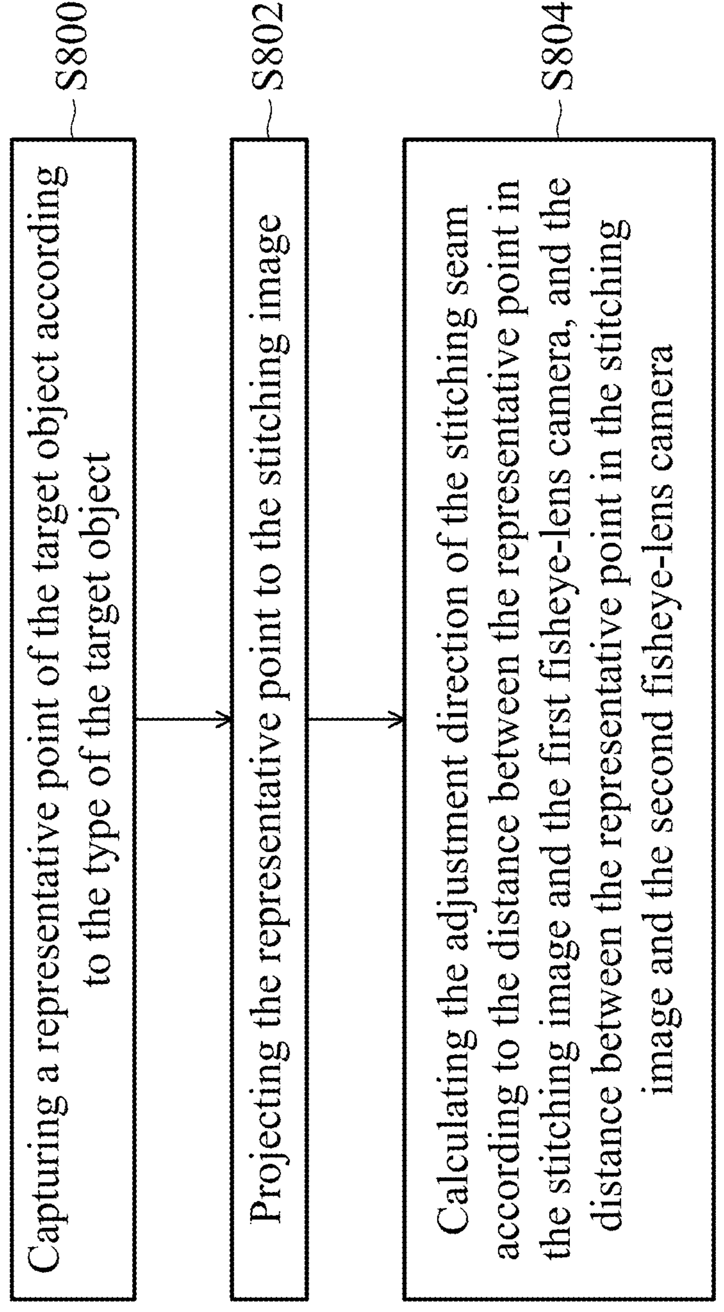
FIG. 8 is a detail flow diagram of step S706 in FIG. 7 in accordance with the present invention.

FIG. 8 is a detail flow diagram of step S706 in FIG. 7 in accordance with some embodiments of the present invention, which includes the following steps. A representative point of the target object detected in step S702 is retrieved according to its object type (step S800), and this representative point is then projected to the stitching image generated in step S704 (step S802). The adjustment direction of the stitching seam is calculated according to the distance between the representative point in the stitching image and the simulated first fisheye-lens camera, and the distance between the representative point in the stitching image and the second simulated fisheye-lens camera (step S804). The object type in step S800 may include, for example, buses, cars, pedestrians, trucks, and riders, but the present invention is not limited thereto. For example, the disclosed stitching-seam adjusting method assigns the object type to 0 if the target object is a bus, the object type to 1 if the target object is a car, the object type to 2 if the target object is a pedestrian, the object type to 3 if the target object is a truck, and the object type to 4 if the target object is a rider, but the present invention is not limited thereto.

In some embodiments, the disclosed stitching-seam adjusting method generates a bounding box around the target object if the target object is determines as a bus, a car, or a truck. Then, the disclosed stitching-seam adjusting method finds the geometric center of the bounding box as the representative point of the target object in step S800. If the target object is determined as a pedestrian or a rider, the disclosed stitching-seam adjusting method generates a bounding box around the target object and then finds a corner of the lower edge of the bounding box as the representative point of the target object in step S800.

Figure 9:
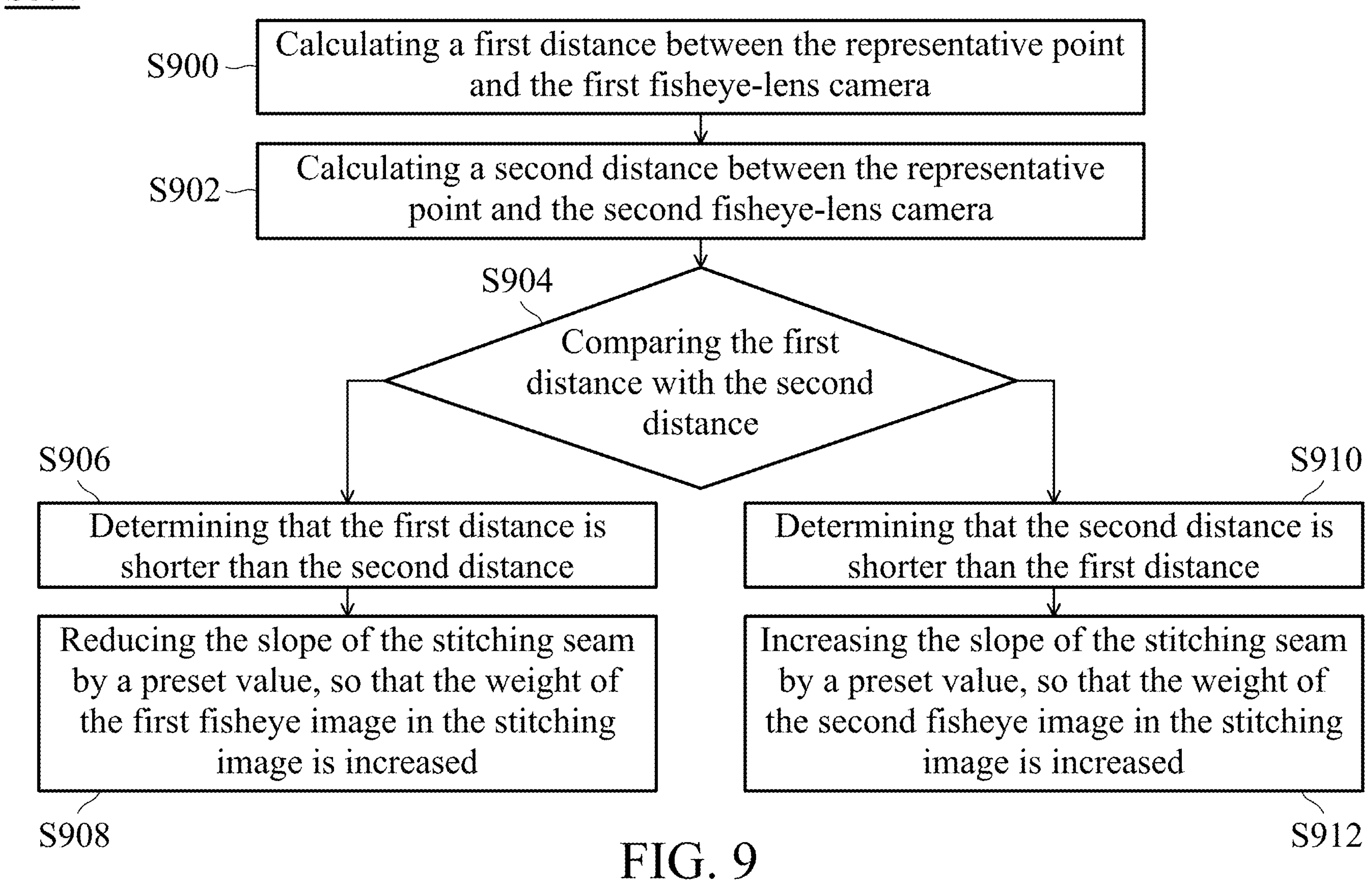
FIG. 9 is a detail flow diagram of step S804 in FIG. 8 in accordance with the present invention.

FIG. 9 is a detail flow diagram of step S804 in FIG. 8 in accordance with some embodiments of the present invention. In some embodiments of FIG. 9, the fourth fisheye image is projected to the left side of the stitching image, and the fifth fisheye image is projected to the right side of the stitching image. As shown in FIG. 9, the disclosed stitching-seam adjusting method includes the following steps. A first distance between the representative point and the simulated first fisheye-lens camera is calculated (step 900), and a second distance between the representative point and the simulated second fisheye-lens camera is calculated (step 902). The first distance and the second distance are compared (step 904). The slope of the stitching seam is decreased by a preset value if the first distance is determined shorter than the second distance (step S906), so that the weight of the first fisheye image in the stitching image is increased (step S908). The slope of the stitching seam is increased by a preset value if the second distance is determined shorter than the first distance (step S910), so that the weight of the second fisheye image in the stitching image is increased (step S912). The reason the step S904 compares the first and second distances is to find the fisheye-lens camera which is closer to the target object than the other. And, the fisheye-lens camera closer to the target object is usually capable of capturing more information regarding the target object for drivers' references. In some embodiments, if the slope change in step S908 is too large, the stitching image may flicker during video frame playback. If the slope change in step S908 is too small, the vehicle driver may be unperceivable of the target object in the stitching image during playback. The preset value of adjusting the slope of stitching seam is 0.005 to make playbacks of the stitching image smoothly, but the present invention is not limited thereto.

Please note there may be more than one target objects appearing in the seam regions (e.g., more than one pedestrians), and their object types may be different (e.g., there may be riders and buses). The disclosed simulated platform may provide simulations on all possible target objects that a vehicle may encounter (especially when these target objects appearing in the seam regions), so as to prevent possible traffic accidents after the vehicle is driving on the road.

Figure 10A:
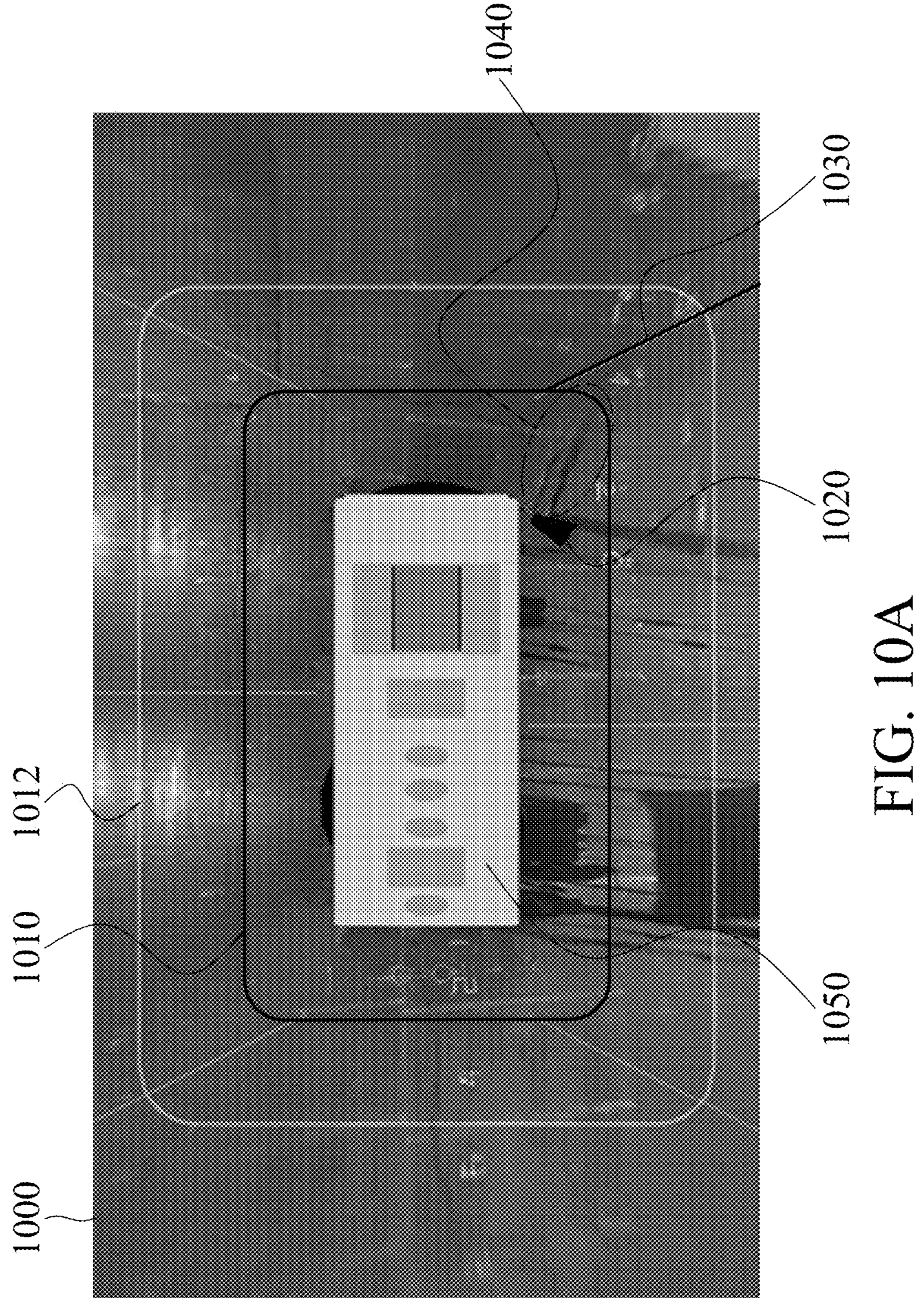
FIG. 10A shows a conventional stitching image 1000 having an object on its overlap regions.

FIG. 10A is a schematic diagram of a stitching image 1000 including stitching seams, which is obtained by using conventional skills without adopting the disclosed stitching-seam adjusting method. As shown in FIG. 10A, the stitching image 1000 includes a simulated vehicle 1050, a first-level warning frame 1010, a second-level warning frame 1012, a stitching seam 1030, a target object 1040, and a representative point 1020. In some embodiments, the first warning zone 1010 and the second warning zone 1012 surround the center point of the simulated vehicle 1050 in the stitching image 1000. The distances between the edge points on the first warning zone 1010 and the center of the simulated vehicle 1050 is shorter than the distances between the edge points on the second warning zone 1012 and the center of the simulated vehicle 1050. In some embodiments, in the stitching image 1000, the stitching seam 1030 is shown between the images generated by the right fisheye-lens camera and the rear fisheye-lens camera of the simulated vehicle 1050. FIG. 10A may also include other stitching seams, but the disclosure only shows the stitching seam 1030 exemplarily.

As shown in FIG. 10A, although the target object 1040 is detected and the representative point 1020 is found according to the position of the target object 1040, the target object 1040 only appears in the first warning zone 1010 but disappears between the first warning zone 1010 and the second warning zone 1012. In other words, the vehicle driver may not perceive the target object 1040 by referring the stitching image 1000, while this blind spot may cause dangers while driving.

Figure 10B:
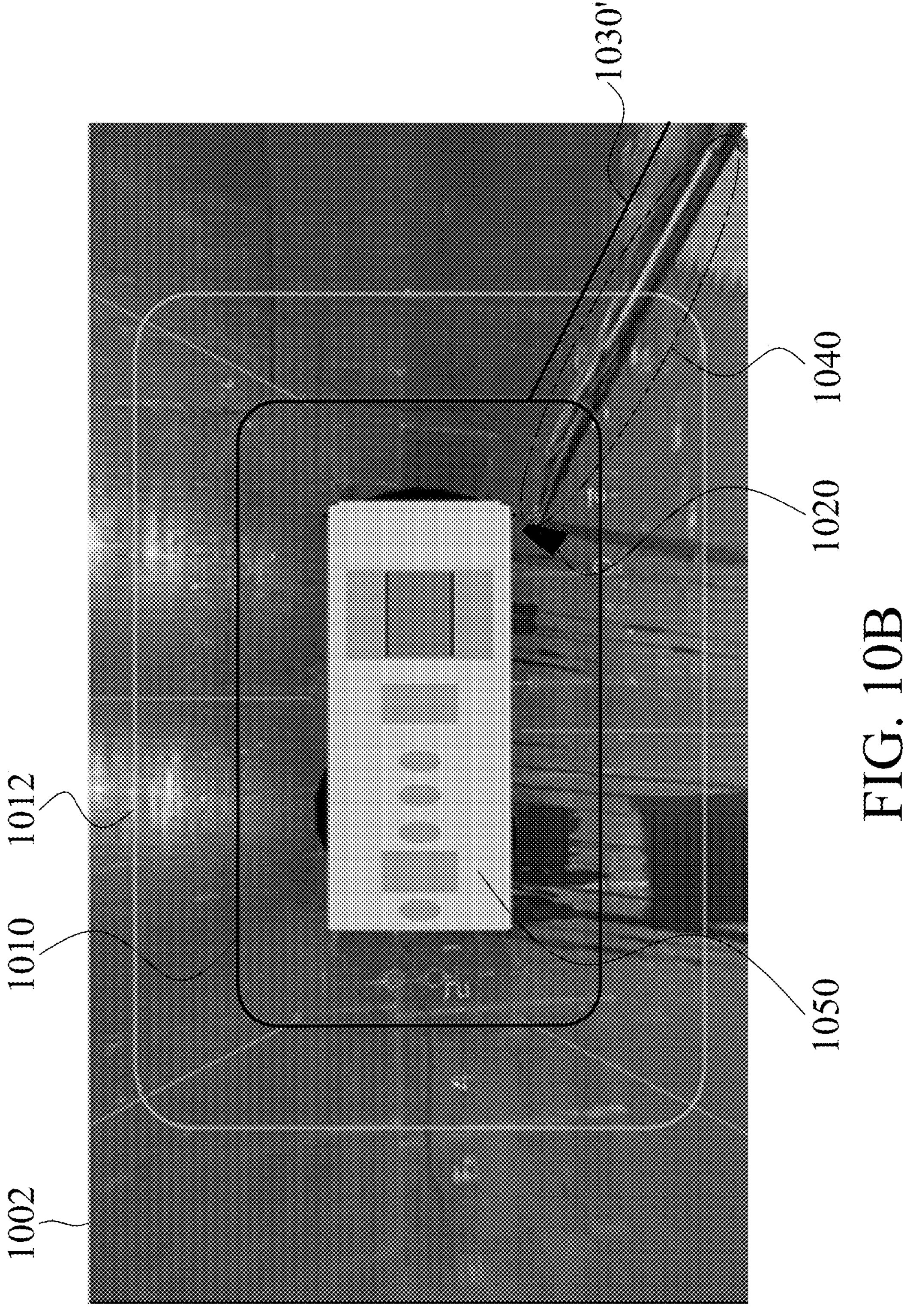
FIG. 10B shows a stitching image 1002 having an object on its overlap regions in accordance with the present invention.

FIG. 10B is a schematic diagram illustrative of a stitching image 1002 employing the disclosed stitching-seam adjusting method. As shown in FIG. 10B, the stitching image 1002 includes the simulated vehicle 1050, the first warning zone 1010, the second warning zone 1012, a stitching seam 1030', the target object 1040, and the representative point 1020. In some embodiments, the first warning zone 1010 and the second warning zone 1012 surround a center point of the simulated vehicle 1050 in the stitching image 1002. The distances between the edge points of the first warning zone 1010 and the center point of the simulated vehicle 1050 is shorter than the distances between the edge points of the second warning zone 1012 and the center point of the simulated vehicle 1050. In some embodiments, in the stitching image 1002, the stitching seam 1030' is shown between the images generated by the right fisheye-lens camera and the rear fisheye-lens camera of the simulated vehicle 1050. FIG. 10B also includes other stitching seams, but the disclosure only shows the stitching seam 1030' exemplarily.

As shown in FIG. 10B, the stitching image 1002 applies the disclosed stitching-seam adjusting method, the absolute value of the slope of the adjusted stitching seam 1030' is smaller than that of the stitching seam 1030 in FIG. 10A, so that whole of the target object 1040 are shown in the stitching image 1002 (because the right fisheye-lens camera is closer to the target object 1040 than the left one, such that it may capture/show more texture information about the target object 1040 in its fisheye image). In some embodiments, when the disclosed stitching-seam adjusting determines that the target object 1040 is within the first warning zone 1010 or the second warning zone 1012, the disclosed stitching-seam adjusting method adjusts the stitching seam 1030' according to the adjustment direction calculated in step S706. In some embodiments, when the disclosed stitching-seam adjusting method determines that the target object 1040 is not within the first zone frame 1010 nor the second warning zone 1012, the disclosed stitching-seam adjusting method does not adjust the stitching seam 1030'. In some embodiments, the stitching seams 1030/1030' in FIGS. 10A/10B are superposed on associated stitching images for the sake of explanations only and there is no visible stitching seam in any actual stitching image.

Figure 11:
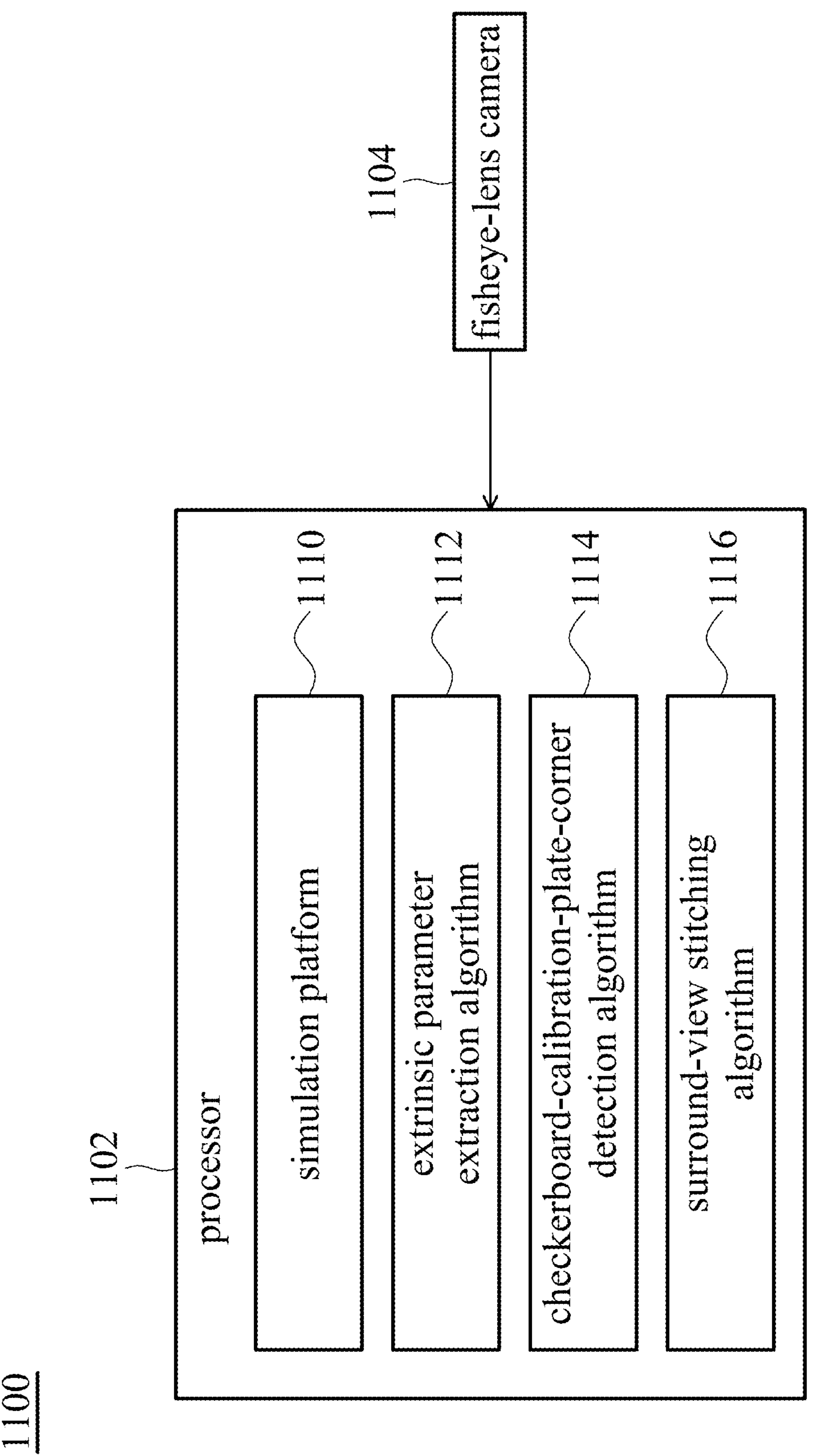
FIG. 11 is a schematic diagram of an electronic device 1100 in accordance with the present invention.

FIG. 11 is a schematic diagram of an electronic device 1100 in accordance with some embodiments of the present invention. As shown in FIG. 11, the electronic device 1100 includes a processor 1102 and a plurality of fisheye-lens cameras 1104. The processor 1102 may operate a simulation platform 1110 and implement an extrinsic-parameter extraction algorithm 1112, a checkerboard-calibration-plate-corner detection algorithm 1114, and a surround-view stitching algorithm 1116. In some embodiments, the processor 1102 may obtain intrinsic parameters associated with the fisheye-lens cameras 1104 and obtain fisheye images therefrom. In some embodiments, the simulation platform 1110 may be, for example, Carla, PerScan, CarSim, VIRES VTD, PTV Vissim, or TESS NG, but the disclosure is not limited thereto. In some embodiments, the processor 1102 operates the simulation platform 1110 to implement the extrinsic-parameter extraction algorithm 1112 to generate required initial extrinsic parameters, performs the checkerboard-calibration-plate-corner detection algorithm 1114 to find the characteristic points of the checkboard calibration plates, executes surround-view stitching algorithm 1116 to complete the optimizations of the extrinsic parameters for vehicle-surround-view systems.

In some embodiments, the processor 1102 operates the simulation platform 1110 to implement the flow of FIG. 2B for processing the reference extrinsic parameters, implement, to implement flow of FIG. 1 to find the initial extrinsic parameters, and to execute the surround-view stitching algorithm 1116 to determine if the errors of the overlap regions is larger than the predetermined stitching-error thresholds.

In some embodiments, the processor 1102 executes the surround-view stitching algorithm 1116 to complete the flows of FIGS. 7-9.

The disclosed method for calibrating the extrinsic parameters of the disclosure effectively improves the efficiency of developers to verify and improve algorithms. By repeatedly calibrating the extrinsic parameters of the fisheye-lens cameras, the accuracy of the stitching images output by the simulation platform is greatly improved so as to accelerate the development processes of the vehicle-surround-view systems. The method for adjusting stitching seams of the disclosure dynamically adjusts the position of the stitching seam when a target object is detected over the seam regions, so that the stitching image successfully display target object (such as a pedestrian) which is missing under conventional skills, thus improving the integrity and safety of the surround-view system.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of a simulated platform for online optimizing extrinsic parameters of fisheye-lens cameras in stitching surround-view images, the method comprising:

establishing a simulated vehicle in the simulation platform according to vehicular characteristics associated with an actual vehicle;

generating a plurality of simulated fisheye-lens cameras according to intrinsic parameters of simulated fisheye lenses of the plurality of the simulated fisheye-lens cameras;

disposing the plurality of simulated fisheye-lens cameras on the simulated vehicle;

placing a plurality of simulated calibration plates surrounding the simulated vehicle;

obtaining initial extrinsic parameters of each of the simulated fisheye-lens cameras, comprising the steps of:

generating a first fisheye image by each of the simulated fisheye-lens cameras, wherein the first fisheye image comprises an image of one of the plurality of the simulated calibration plates; and generating the initial extrinsic parameters of each of the simulated fisheye-lens cameras by using a first characteristic point within the image of one of the plurality of the simulated calibration plates;

optimizing the extrinsic parameters of each of the simulated fisheye-lens cameras, comprising the steps of:

generating at least one second fisheye image according to the initial extrinsic parameters of each of the simulated fisheye-lens cameras;

generating a second stitching image by using the second fisheye images of two adjacently simulated fisheye-lens cameras according to a predetermined direction; and determining if the extrinsic parameters of each of the simulated fisheye-lens cameras is optimized according to errors of overlap regions of the second stitching image.

2. The method of claim 1, further comprising the simulated platform automatically places a plurality of predetermined simulated calibration plates surrounding the simulated vehicle when a first shortcut key is activated.

3. The method of claim 1, further comprising the simulated platform automatically disposes the plurality of simulated fisheye-lens cameras on the simulated vehicle when a second shortcut key is activated.

4. The method of claim 3, further comprising the simulated platform automatically stores the first fisheye images after the first fisheye images are generated.

5. The method of claim 3, wherein the simulated fisheye-lens cameras are indicated by a user over the simulated platform.

6. The method of claim 1, wherein the simulated platform automatically aligns camera coordinate systems of the simulated fisheye-lens cameras with a world coordinate system after the initial extrinsic parameters of the simulated fisheye-lens cameras are generated.

7. The method of claim 6, wherein the simulated platform adjusts a transform matrix and a rotation matrix associated with the initial extrinsic parameters to align the camera coordinate systems with the world coordinate system.

8. The method of claim 6, wherein the step of optimizing the extrinsic parameters comprises:

transforming a second characteristic point to a third characteristic point after the camera coordinate systems align with the world coordinate system; and optimizing the extrinsic parameters of each of the simulated fisheye-lens cameras by determining if the errors of overlap regions of the second stitching image is larger than a stitching-error threshold by referring to the third characteristic point.

9. The method of claim 8, further comprising:

adjusting the initial extrinsic parameters of the two adjacently simulated fisheye-lens cameras to generate an updated second stitching image if the errors of overlap regions of the second stitching image is determined larger than the stitching-error threshold; and determining errors of overlap regions of the updated second stitching image is determined larger than the stitching-error threshold.

10. The method of claim 8, wherein the second characteristic point is an edge of the simulated calibration plates, interior vertex point, a traffic line, a texture of the overlap regions recognizable by the simulated platform.

11. The method of claim 1, wherein the first characteristic point is an interior vertex point of one of the simulated checkerboard calibration plates.

12. The method of claim 11, further comprising:

obtaining a position of the interior vertex point in the world coordinate system by using a calibration-plate-corner detection algorithm; and generating the initial extrinsic parameters according to the position of the interior vertex point in the world coordinate system.

13. The method of claim 1, wherein the first fisheye image is identical to the second fisheye image.

14. The method of claim 1, further comprising optimizing the second stitching images after all of the initial extrinsic parameters of the simulated fisheye-lens camera are optimized.

15. The method of claim 14, wherein the step of optimizing the second stitching images comprises re-projection-error minimizations, color/brightness adjustments, and smooth transitions to remove jagged edges or inconsistences of the seam regions.

16. The method of claim 1, further comprising:

generating a reference extrinsic parameter for one of the adjacently simulated fisheye-lens cameras;

generating a third fisheye image by one of the adjacently simulated fisheye-lens cameras being introduced the reference extrinsic parameters;

generating a third stitching image by using the third fisheye image and the fisheye image generated by the other one of the adjacently simulated fisheye-lens cameras; and outputting an offset of the reference extrinsic parameters as a tolerance if errors of overlap regions of the third stitching image is determined larger than a stitching-error threshold.

17. The method of claim 16, wherein the reference extrinsic parameters are generated by introducing the offset into the initial extrinsic parameters.

18. The method of claim 16, further comprising the step of increasing the offset an increment and introducing to the initial extrinsic parameters of the one of the adjacently simulated fisheye-lens cameras if errors of overlap regions of the third stitching image is determined smaller than a stitching-error threshold.

19. The method of claim 1, wherein the simulation platform comprises Carla, PerScan, CarSim, VIRES VTD, PTV Vissim, or TESS NG.

20. A method of a simulated platform for online optimizing extrinsic parameters of fisheye-lens cameras in stitching surround-view images, the method comprising:

generating at least one fisheye images by each of the simulated fisheye-lens cameras;

generating a stitching image by using the fisheye images of two adjacently simulated fisheye-lens cameras according to a predetermined direction;

determining if the extrinsic parameters of each of the simulated fisheye-lens cameras is optimized according to errors of overlap regions of the stitching image;

transforming a first characteristic point to a second characteristic point after camera coordinate systems of each of the simulated fisheye-lens cameras align with a world coordinate system; and optimizing the extrinsic parameters of each of the simulated fisheye-lens cameras by determining if the errors of overlap regions of the stitching image is larger than a stitching-error threshold by referring to the third characteristic point.

21. The method of claim 20, further comprising:

adjusting current extrinsic parameters of the two adjacently simulated fisheye-lens cameras to generate an updated stitching image if the errors of overlap regions of the stitching image is determined larger than a stitching-error threshold; and determining errors of overlap regions of the updated stitching image is determined larger than the stitching-error threshold.

22. The method of claim 21, wherein the steps of generating the stitching image, determining if the extrinsic parameters of each of the simulated fisheye-lens cameras is optimized, transforming the first characteristic point to the third characteristic point, adjusting the current extrinsic parameters of the two adjacently simulated fisheye-lens cameras is larger than the stitching-error threshold, generating the updated stitching image, and determining errors of overlap regions of the updated stitching image is determined larger than the stitching-error threshold are operated by the simulated platform after the fisheye images are generated.

23. The method of claim 20, wherein the first characteristic point is an edge of edges or interior vertex points of a calibration plate, a traffic line, or any identifiable textures of the overlap regions of the stitching image.

24. The method of claim 20, further comprising optimizing a surround-view stitching image made by all of the simulated fisheye-lens cameras after all the extrinsic parameters of the simulated fisheye-lens cameras are optimized.

25. The method of claim 24, wherein the optimizations of the surround-view stitching image comprise re-projection-error minimizations, color/brightness adjustments, and smooth transitions to remove jagged edges or inconsistences of the seam regions.

26. The method of claim 20, wherein each of the images is generated by a fisheye-lens camera installed on a vehicle.

* * * * *